(12) United States Patent
Choi et al.

(10) Patent No.: US 10,875,398 B2
(45) Date of Patent: Dec. 29, 2020

(54) POWER TRANSMISSION SYSTEM OF HYBRID ELECTRIC VEHICLE

(71) Applicants: Hyundai Motor Company, Seoul (KR); Kia Motors Corporation, Seoul (KR)

(72) Inventors: Yeongil Choi, Suwon-si (KR); Tal Chol Kim, Bucheon-si (KR); Hyung Seuk Oh, Seoul (KR); Wan Soo Kim, Hwaseong-si (KR); Yeonho Kim, Suwon-si (KR); Kyungha Kim, Yongin-si (KR); Shin Jong Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

(21) Appl. No.: 16/204,988

(22) Filed: Nov. 29, 2018

(65) Prior Publication Data

US 2020/0062101 A1    Feb. 27, 2020

(30) Foreign Application Priority Data

Aug. 22, 2018 (KR) .................. 10-2018-0098120

(51) Int. Cl.
| | |
|---|---|
| *F16H 3/72* | (2006.01) |
| *B60K 6/36* | (2007.10) |
| *B60W 10/08* | (2006.01) |
| *B60L 15/20* | (2006.01) |
| *B60K 6/42* | (2007.10) |

(52) U.S. Cl.
CPC .................. *B60K 6/36* (2013.01); *B60K 6/42* (2013.01); *B60L 15/2054* (2013.01); *B60W 10/08* (2013.01)

(58) Field of Classification Search
None
See application file for complete search history.

(56) References Cited

U.S. PATENT DOCUMENTS

| | | | |
|---|---|---|---|
| 2007/0202987 A1* | 8/2007 | Kakinami | ............... B60L 50/16 477/3 |
| 2008/0076623 A1* | 3/2008 | Tabata | ................ B60L 15/2054 477/5 |
| 2008/0176697 A1* | 7/2008 | Raghavan | ............... F16H 3/728 475/5 |

FOREIGN PATENT DOCUMENTS

WO    WO-2012025204 A1 *    3/2012    ............. B60K 6/365

\* cited by examiner

*Primary Examiner* — Charles A Fox
*Assistant Examiner* — Ryan P Dodd
(74) *Attorney, Agent, or Firm* — Morgan, Lewis & Bockius LLP

(57) ABSTRACT

A power transmission apparatus of a hybrid electric vehicle may include an input shaft receiving an engine torque output from an engine, an output shaft disposed at a same axis with the input shaft and outputting a shifted torque, first and second motor/generators, a first shifting section including a first planetary gear set, outputting a rotation speed from the input shaft as inputted or increased, or forming an adjusted torque from the engine torque and torques of the first and second motor/generators, and outputting the adjusted torque, and a second shifting section including a compound planetary gear set formed as a combination of second and third planetary gear sets and outputting a shifted torque at least three stages from a torque received from the first shifting section to the output shaft.

18 Claims, 12 Drawing Sheets

FIG. 2

| Shift-stage | Engagement element | | | | | |
|---|---|---|---|---|---|---|
| | B1 | B2 | B3 | B4 | C1 | C2 |
| EV1 | | (○) | | ○ | | |
| EV2 | | (○) | ○ | | | |
| EV3 | | (○) | | | | ○ |
| I/S 1 | | | | ○ | | |
| I/S 2 | | | ○ | | | |
| I/S 3 | | | | | | ○ |
| P1 | | | | ○ | ○ | |
| P2 | ○ | | | ○ | | |
| P3 | | | ○ | | ○ | |
| P4 | ○ | | ○ | | | |
| P5 | | | | | ○ | ○ |
| P6 | ○ | | | | | ○ |

FIG. 5

| Shift-stage | | Engagement element | | | | | | |
|---|---|---|---|---|---|---|---|---|
| | | B1 | B2 | B3 | B4 | C1 | C2 | C3 |
| D | EV1 | | (O) | | O | | | O |
| | EV2 | | (O) | O | | | | O |
| | EV3 | | (O) | | | | O | O |
| | I/S 1 | | | | O | | | O |
| | I/S 2 | | | O | | | | O |
| | I/S 3 | | | | | | O | O |
| | P1 | | | | O | O | | O |
| | P2 | O | | | O | | | O |
| | P3 | | | O | | O | | O |
| | P4 | O | | O | | | | O |
| | P5 | | | | | O | O | O |
| | P6 | O | | | | | O | O |
| REV | EV1 | | (O) | | O | | O | |
| | I/S 1 | | | | O | | O | |
| | P1 | | | | O | O | O | |
| | P2 | O | | | O | | O | |

FIG. 8

| Shift-stage | Engagement element | | | | | | |
|---|---|---|---|---|---|---|---|
| | B1 | B2 | B3 | B4 | C1 | C2 | C3 |
| EV1 | | (O) | | O | | | O |
| EV2 | | (O) | O | | | | O |
| EV3 | | (O) | | | | O | O |
| EV4 | | (O) | O | | | O | |
| I/S 1 | | | | O | | | O |
| I/S 2 | | | O | | | | O |
| I/S 3 | | | | | | O | O |
| I/S 4 | | | O | | | O | |
| P1 | | | | O | O | | O |
| P2 | O | | | O | | | O |
| P3 | | | O | | O | | O |
| P4 | O | | O | | | | O |
| P5 | | | | | O | O | O |
| P6 | O | | | | | O | O |
| P7 | | | O | | O | O | |
| P8 | O | | O | | | O | |

FIG. 11

| Shift-stage | | Engagement element | | | | | | | |
|---|---|---|---|---|---|---|---|---|---|
| | | B1 | B2 | B3 | B4 | C1 | C2 | C3 | C4 |
| D | EV1 | | (O) | | O | | | O | |
| | EV2 | | (O) | O | | | | O | |
| | EV3 | | (O) | | | | O | O | O |
| | EV4 | | (O) | O | | | | | O |
| | I/S 1 | | | | O | | | O | |
| | I/S 2 | | | O | | | | O | |
| | I/S 3 | | | | | | O | O | O |
| | I/S 4 | | | | O | | | | O |
| | P1 | | | | O | O | | O | |
| | P2 | O | | | O | | | O | |
| | P3 | | | O | | O | | O | |
| | P4 | O | | O | | | | O | |
| | P5 | | | | | O | O | O | O |
| | P6 | O | | | | | O | O | O |
| | P7 | | | O | | O | | | O |
| | P8 | O | | O | | | | | O |
| REV | EV1 | | (O) | | O | O | | | |
| | I/S 1 | | | | O | O | | | |
| | P1 | | | | O | O | O | | |
| | P2 | O | | | O | | O | | |

POWER TRANSMISSION SYSTEM OF HYBRID ELECTRIC VEHICLE

CROSS-REFERENCE TO RELATED APPLICATION

The present application claims priority to Korean Patent Application No. 10-2018-0098120 filed on Aug. 22, 2018, the entire contents of which is incorporated herein for all purposes by this reference.

BACKGROUND OF THE INVENTION

Field of the Invention

The present invention relates to a power transmission apparatus for a hybrid electric vehicle. More specifically, the present invention relates to a power transmission apparatus for a hybrid electric vehicle capable of achieving high performance and dynamic drivability by maximizing a wheel torque using two motor/generators in a multi-stage automatic transmission.

Description of Related Art

An environmentally-friendly technology of a vehicle is a core technology which controls survival of a future vehicle industry, and advanced vehicle makers have focused their energy on the development of an environmentally-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electrical energy are mixed and used as the power sources.

In the hybrid electric vehicle, an EV mode in which the hybrid electric vehicle is driven by only the motor, an HEV mode using both the engine and the motor, and an ENG mode using only the engine may be implemented according to the combination of the engine and the motor. Furthermore, the hybrid electric vehicle can acquire a significant fuel efficiency enhancement effect as compared with the conventional vehicle through idle stop of stopping the engine when the vehicle stops, fuel saving by regenerative braking that drives a generator by use of kinetic energy of the vehicle instead of braking by the existing friction when the vehicle is braked, and stores in a battery electrical energy generated at the time of driving the generator and reuses the stored electrical energy in driving the vehicle, and the like.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a power transmission apparatus of a hybrid electric vehicle having an advantage of high performance and dynamic drivability.

A power transmission apparatus of a hybrid electric vehicle according to various exemplary embodiments of the present invention may include an input shaft receiving an engine torque output from an engine, an output shaft disposed at a same axis with the input shaft and outputting a shifted torque, first and second motor/generators, a first shifting section including a first planetary gear set, outputting a rotation speed from the input shaft as inputted or increased, or forming an adjusted torque from the engine torque and torques of the first and second motor/generators, and outputting the adjusted torque, and a second shifting section including a compound planetary gear set formed as a combination of second and third planetary gear sets and outputting a shifted torque at least three stages from a torque received from the first shifting section to the output shaft.

The first planetary gear set may include first, second, and third rotation elements and the first shifting section may further include a first shaft fixedly connected to the first rotation element, fixedly connected to the first motor/generator and selectively connectable to a transmission housing, a second shaft fixedly connected to the second rotation element, fixedly connected to the input shaft and selectively connectable to the transmission housing and a third shaft fixedly connected to the third rotation element, fixedly connected to the second motor/generator and selectively connectable to the second shaft.

The first planetary gear set may be a single pinion planetary gear set having a first sun gear, a first planet carrier, and a first ring gear that, respectively form first, second, and third rotation elements.

The compound planetary gear set may form fourth, fifth, sixth and seventh rotation elements as the combination of second and third planetary gear sets, and the second shifting section may further include a fourth shaft fixedly connected to the fourth rotation element and fixedly connected to the third shaft, a fifth shaft fixedly connected to the fifth rotation element and fixedly connected to the output shaft, a sixth shaft fixedly connected to the sixth rotation element and selectively connectable to the fifth shaft or selectively connectable to the transmission housing, a seventh shaft fixedly connected to the seventh rotation element and selectively connectable to the transmission housing, and a plurality of engagement element including a plurality of clutches connecting corresponding shafts and a plurality of brakes connecting a corresponding shaft and the transmission housing.

The second planetary gear set may be a single pinion planetary gear set having a second sun gear, a second planet carrier and a second ring gear, the third planetary gear set may be a single pinion planetary gear set having a third sun gear, a third planet carrier and a third ring gear, and the compound planetary gear set may form fourth, fifth, sixth and seventh rotation element as the third sun gear, the second ring gear and the third planet carrier, the second planet carrier and the third ring gear, and the second sun gear respectively.

The plurality of engagement elements may include a first clutch disposed between the second shaft and the third shaft, a second clutch disposed between the fifth shaft and the sixth shaft, a first brake disposed between the first shaft and the transmission housing, a second brake disposed between the second shaft and the transmission housing, a third brake disposed between the seventh shaft and the transmission housing, and a fourth brake disposed between the sixth shaft and the transmission housing.

The compound planetary gear set may form fourth, fifth, sixth and seventh rotation elements as the combination of second and third planetary gear sets, and the second shifting section may further include a fourth shaft fixedly connected to the fourth rotation element and fixedly connected to the third shaft, a fifth shaft fixedly connected to the fifth rotation element and fixedly connected to the output shaft, a sixth shaft fixedly connected to the sixth rotation element and selectively connectable to the transmission housing, a seventh shaft fixedly connected to the seventh rotation element and selectively connectable to the sixth shaft or selectively connectable to the transmission housing respectively, and a plurality of engagement element including a plurality of clutches connecting corresponding shafts and a plurality of brakes connecting a corresponding shaft and the transmission housing.

The second planetary gear set may be a single pinion planetary gear set having a second sun gear, a common planet carrier, and a common ring gear, the third planetary gear set may be a double pinion planetary gear set having a third sun gear, the common planet carrier, and the common ring gear, and the compound planetary gear set may form fourth, fifth, sixth and seventh rotation element as the third sun gear, the common ring gear, the common planet carrier and the second sun gear respectively.

The plurality of engagement elements may include a first clutch disposed between the second shaft and the third shaft, a second clutch; disposed between the sixth shaft and seventh shaft, a first brake disposed between the first shaft and the transmission housing, a second brake disposed between the second shaft and the transmission housing, a third brake disposed between the seventh shaft and the transmission housing, and a fourth brake disposed between the sixth shaft and the transmission housing.

The compound planetary gear set may form fourth, fifth, sixth and seventh rotation elements as the combination of second and third planetary gear sets, and the second shifting section may further include a fourth shaft fixedly connected to the fourth rotation element and selectively connectable to the third shaft, a fifth shaft fixedly connected to the fifth rotation element and fixedly connected to the output shaft, a sixth shaft fixedly connected to the sixth rotation element and selectively connectable to the transmission housing, a seventh shaft fixedly connected to the seventh rotation element and selectively connectable to the third shaft or selectively connectable to the transmission housing respectively, and a plurality of engagement element including a plurality of clutches connecting corresponding shafts and a plurality of brakes connecting a corresponding shaft and the transmission housing.

The second planetary gear set may be a single pinion planetary gear set having a second sun gear, a second planet carrier and a second ring gear, the third planetary gear set may be a single pinion planetary gear set having a third sun gear, a third planet carrier and a third ring gear, and the compound planetary gear set may form fourth, fifth, sixth and seventh rotation element as the third sun gear, the second ring gear and the third planet carrier, the second planet carrier and the third ring gear, and the second sun gear respectively.

The plurality of engagement elements may include a first clutch disposed between the second shaft and the third shaft, a second clutch disposed between the third shaft and the seventh shaft, a third clutch disposed between the third shaft and the fourth shaft, a first brake disposed between the first shaft and the transmission housing, a second brake disposed between the second shaft and the transmission housing, a third brake disposed between the seventh shaft and the transmission housing, and a fourth brake disposed between the sixth shaft and the transmission housing.

The second planetary gear set may be a single pinion planetary gear set having a second sun gear, a common planet carrier, and a common ring gear, the third planetary gear set may be a double pinion planetary gear set having a third sun gear, the common planet carrier, and the common ring gear, and the compound planetary gear set may form fourth, fifth, sixth and seventh rotation element as the third sun gear, the common ring gear, the common planet carrier and the second sun gear respectively.

The compound planetary gear set may form fourth, fifth, sixth and seventh rotation elements as the combination of second and third planetary gear sets, and the second shifting section may further include a fourth shaft fixedly connected to the fourth rotation element and selectively connectable to the third shaft, a fifth shaft fixedly connected to the fifth rotation element and fixedly connected to the output shaft, a sixth shaft fixedly connected to the sixth rotation element and selectively connectable to the third shaft or selectively connectable to the transmission housing respectively, a seventh shaft fixedly connected to the seventh rotation element and selectively connectable to the transmission housing, and a plurality of engagement element including a plurality of clutches connecting corresponding shafts and a plurality of brakes connecting a corresponding shaft and the transmission housing.

The second planetary gear set may be a single pinion planetary gear set having a second sun gear, a second planet carrier and a second ring gear, the third planetary gear set is a single pinion planetary gear set having a third sun gear, a third planet carrier and a third ring gear and the compound planetary gear set forms fourth, fifth, sixth and seventh rotation element as the third sun gear, the second ring gear and the third planet carrier, the second planet carrier and the third ring gear, and the second sun gear respectively.

The plurality of engagement elements may include a first clutch disposed between the second shaft and the third shaft, a second clutch disposed between the third shaft and the sixth shaft, a third clutch disposed between the third shaft and the fourth shaft, a first brake disposed between the first shaft and the transmission housing, a second brake disposed between the second shaft and the transmission housing, a third brake disposed between the seventh shaft and the transmission housing, and a fourth brake disposed between the sixth shaft and the transmission housing.

The second planetary gear set may be a single pinion planetary gear set having a second sun gear, a second planet carrier and a second ring gear, the third planetary gear set may be a single pinion planetary gear set having a third sun gear, a third planet carrier and a third ring gear, and the compound planetary gear set forms fourth, fifth, sixth and seventh rotation element as the third sun gear, the second ring gear and the third planet carrier, the second planet carrier and the third ring gear, and the second sun gear respectively.

The compound planetary gear set may form fourth, fifth, sixth and seventh rotation elements as the combination of second and third planetary gear sets, and the second shifting section may further include a fourth shaft fixedly connected to the fourth rotation element and selectively connectable to the third shaft, a fifth shaft fixedly connected to the fifth rotation element and fixedly connected to the output shaft, a sixth shaft fixedly connected to the sixth rotation element and selectively connectable to the transmission housing, a seventh shaft fixedly connected to the seventh rotation element and selectively connectable to the third shaft or selectively connectable to the transmission housing respectively, and a plurality of engagement element including a plurality of clutches connecting corresponding shafts and a plurality of brakes connecting a corresponding shaft and the transmission housing.

The second planetary gear set may be a single pinion planetary gear set having a second sun gear, a second planet carrier and a second ring gear, the third planetary gear set may be a single pinion planetary gear set having a third sun gear, a third planet carrier and a third ring gear, and the compound planetary gear set forms fourth, fifth, sixth and seventh rotation element as the third sun gear, the second ring gear and the third planet carrier, the second planet carrier and the third ring gear, and the second sun gear respectively.

The plurality of engagement elements may include a first clutch disposed between the second shaft and the third shaft, a second clutch disposed between the third shaft and the seventh shaft, a third clutch disposed between the third shaft and the fourth shaft, a fourth clutch disposed between the third shaft and the sixth shaft, a first brake disposed between the first shaft and the transmission housing, a second brake disposed between the second shaft and the transmission housing, a third brake disposed between the seventh shaft and the transmission housing, and a fourth brake disposed between the sixth shaft and the transmission housing.

The second planetary gear set may be a single pinion planetary gear set having a second sun gear, a common planet carrier, and a common ring gear, the third planetary gear set may be a double pinion planetary gear set having a third sun gear, the common planet carrier, and the common ring gear, and the compound planetary gear set may form fourth, fifth, sixth and seventh rotation element as the third sun gear, the common ring gear, the common planet carrier and the second sun gear respectively.

A power transmission apparatus of a hybrid electric vehicle according to various exemplary embodiments of the present invention enables usage of first and second motor/generators while driving in a parallel mode of multiple shifting stages, providing high performance and dynamic drivability.

Furthermore, a power transmission apparatus of a hybrid electric vehicle according to various exemplary embodiments of the present invention enables driving in an EV mode and a torque splitting mode, improving fuel economy.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a shifting operation chart of a power transmission apparatus of a hybrid electric vehicle according to various exemplary embodiments of the present invention.

FIG. 5 is a shifting operation chart of a power transmission apparatus of a hybrid electric vehicle according to various exemplary embodiments of the present invention.

FIG. 8 is a shifting operation chart of a power transmission apparatus of a hybrid electric vehicle according to various exemplary embodiments of the present invention.

FIG. 11 is a shifting operation chart of a power transmission apparatus of a hybrid electric vehicle according to various exemplary embodiments of the present invention.

Figure 1:
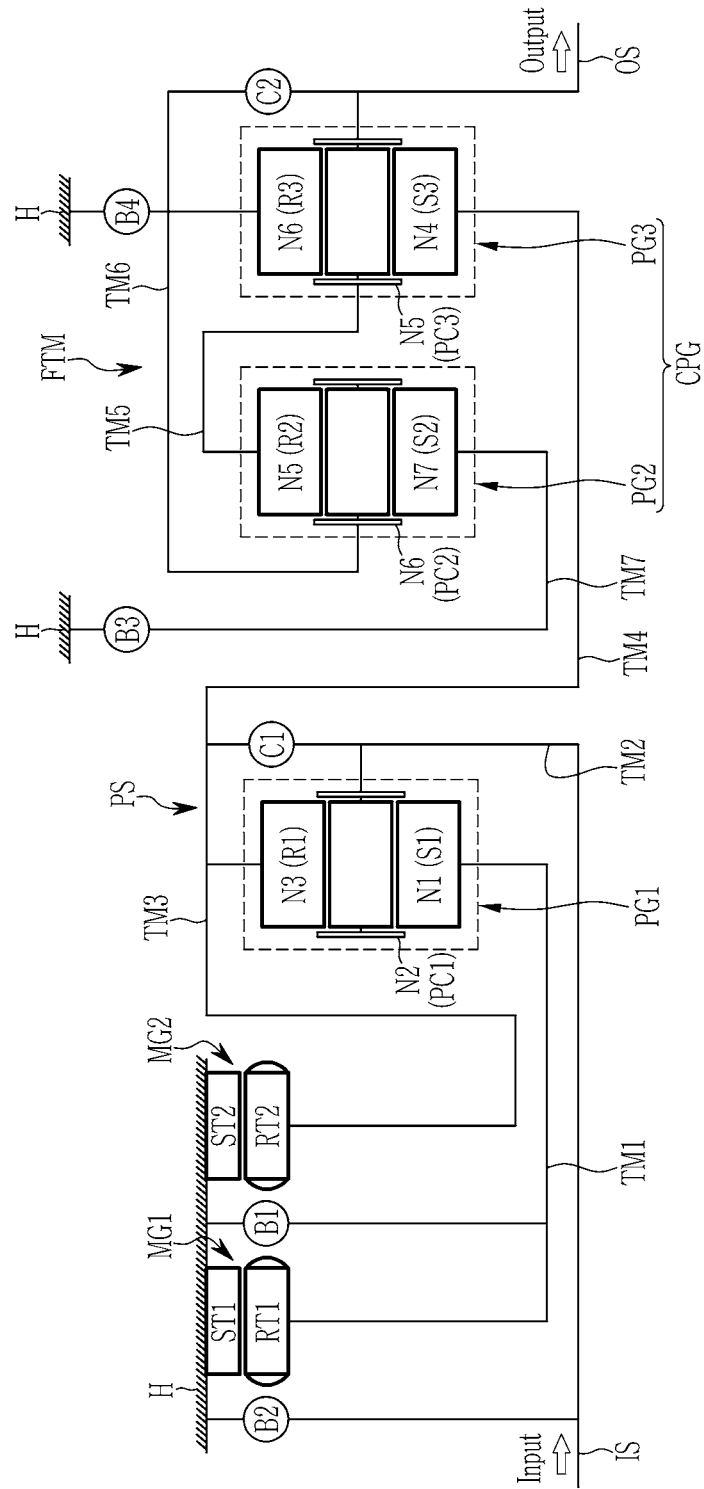
FIG. 1 is a schematic diagram of a power transmission apparatus of a hybrid electric vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to various exemplary embodiments of the present invention.

Referring to FIG. 1, a power transmission apparatus of a hybrid electric vehicle according to various exemplary embodiments of the present invention shifts torques of power sources of an engine ENG and first and second motor/generators MG1 and MG2, and includes an input shaft IS receiving a torque output from the engine, a first shifting section PS outputting a rotation speed from the input shaft IS as inputted or increased, or forming an adjusted torque from the engine torque and the torques of the first and second motor/generators MG1 and MG2, and outputting the adjusted torque, a second shifting section TM shifting the torque received from the first shifting section PS into a plurality of shifting stages, and an output shaft OS outputting a torque received from the second shifting section TM to a differential apparatus.

The engine ENG is a primary power source and a variety of typical engines such as a gasoline engine or a diesel engine that utilizes fossil fuel may be used as the engine ENG.

The first, second motor/generators MG1 and MG2 are auxiliary power sources and connected to the first shifting section PS.

Each of the first and second motor/generators MG1 and MG2 may act as a motor and also as a generator, and includes first and second stators ST1 and ST2 and first and second rotors RT1 and RT2, where the first and second stators ST1 and ST2 are fixed to a transmission housing H and the first and second rotors RT1 and RT2 are rotatably supported within the first and second stators ST1 and ST2.

The first shifting section PS includes a first planetary gear set PG1.

The first planetary gear set PG1 is a single pinion planetary gear set and includes a first sun gear S1, a first planet carrier PC1 rotatably supporting a first pinion P1 which is externally meshed with the first sun gear S1, and a first ring gear R1 which is internally meshed with the first pinion P1 respectively as first, second, and third rotation elements N1, N2, and N3, and the first shifting section PS further include first, second, and third shafts TM1, TM2 and TM3.

The second shifting section FTM includes a compound planetary gear set formed as a combination of second and third planetary gear sets PG2 and PG3, which are single pinion planetary gear sets.

The second planetary gear set PG2 includes a second sun gear S2, a second planet carrier PC2 and a second ring gear R2, and the third planetary gear sets PG3 includes a third sun gear S3, a third planet carrier PC3 and a third ring gear R3. The second planet carrier PC2 is fixedly connected to the third ring gear R3, the second ring gear R2 is fixedly connected to the third planet carrier PC3. In the instant case, third sun gear S3, second ring gear R2 and the third planet carrier PC3, the second planet carrier PC2 and the third ring gear R3, and the second sun gear S2 are a fourth rotation element N4, fifth rotation element N5, a sixth rotation element N6 and a seventh rotation element N7 respectively. The second shifting section FTM further includes fourth, fifth, sixth and seventh shafts TM4, TM5, TM6 and TM7.

The first to seventh rotation elements N1-N7 are fixedly connected to the shafts TM1-TM7 respectively and the shafts are selectively connectable to each other or to the transmission housing H by the engagement elements including clutches and brakes.

The seven shafts TM1 to TM7 are disposed as follows.

The first shaft TM1 is fixedly connected to the first rotation element N1 (the first sun gear S1), fixedly connected to the first motor/generator MG1, and selectively acts as an input element, or selectively acts as a fixed element.

The second shaft TM2 is fixedly connected to the second rotation element N2 (the first planet carrier PC1), fixedly connected to the input shaft IS, and selectively acts as an input element, or selectively acts as a fixed element.

The third shaft TM3 is fixedly connected to the third rotation element N3 (the first ring gear R1), fixedly connected to the second motor/generator MG2, and acts as an input element.

The fourth shaft TM4 is fixedly connected to the fourth rotation element N4 (the third sun gear S3), fixedly connected to the third shaft TM3, and acts as an input element.

The fifth shaft TM5 is fixedly connected to the fifth rotation element N5 (the second ring gear R2 and the third planet carrier PC3), and fixedly connected to the output shaft OS, acting as an output element.

The sixth shaft TM6 is fixedly connected to the sixth rotation element N6 (the second planet carrier PC2 and the third ring gear R3), and selectively acts as a fixed element.

The seventh shaft TM7 is fixedly connected to the seventh rotation element N7 (the second sun gear S2), and selectively acts as a fixed element.

Each of the seven shafts TM1 to TM7 may be a rotation member which is fixedly connected to the input and output shafts and rotation elements of the planetary gear sets PG1, PG2, and PG3, or may be a rotation member that selectively interconnects a rotation element to the transmission housing H, or may be a fixed member fixed to the transmission housing H.

In the disclosure, when two or more members are described to be "fixedly connected", where each of the members may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged.

It may be understood that in the case that a member is "selectively connectable" with a transmission housing by an engagement element, the member may be stationary when the engagement element is engaged.

Six engagement elements of first clutch and second clutch C1 and C2 and first, second, third, and fourth brakes BK1, BK2, BK3 and BK4 are disposed between a corresponding pair of the seven shafts TM1 to TM7, the input shaft, the output shaft, the first and second motor/generators, and the transmission housing H, to form selective connections.

The two clutches C1 and C2 and the four brakes BK1, BK2, BK3 and BK4 are disposed as follows.

The first clutch C1 is disposed between the second shaft TM2 and the third shaft TM3 and selectively connects the second shaft TM2 and the third shaft TM3, controlling power delivery there between.

The second clutch C2 is disposed between the fifth shaft TM5 and the sixth shaft TM6 and selectively connects the fifth shaft TM5 and the sixth shaft TM6, controlling power delivery there between.

The first brake B1 is disposed between the first shaft TM1 and the transmission housing H, and selectively connects the first shaft TM1 to the transmission housing H.

The second brake B2 is disposed between the second shaft TM2 and the transmission housing H, and selectively connects the second shaft TM2 to the transmission housing H.

The third brake B3 is disposed between the seventh shaft TM7 and the transmission housing H, and selectively connects the seventh shaft TM7 to the transmission housing H.

The fourth brake B4 is disposed between the sixth shaft TM6 and the transmission housing H, and selectively connects the sixth shaft TM6 to the transmission housing H.

The first clutch C1 selectively connects two rotation elements of the first planetary gear set PG1, and forces the first planetary gear set PG1 to integrally rotate. The second clutch C2 selectively connects two rotation elements of the four rotation elements of the second planetary gear set PG2 and the third planetary gear set PG3, and forces the second planetary gear set PG2 and the third planetary gear set PG3 to integrally rotate.

The engagement elements of the first clutch and second clutch C1 and C2 and the first to fourth brakes BK1 to BK4 may be realized as multi-plate hydraulic pressure friction devices that are frictionally engaged by hydraulic pressure, however, it may not be understood to be limited thereto, since various other configuration that are electrically controllable may be available.

FIG. 2 is a shifting operation chart of a power transmission apparatus of a hybrid electric vehicle according to various exemplary embodiments of the present invention.

Referring to FIG. 2, a power transmission apparatus of a hybrid electric vehicle according to various exemplary embodiments of the present invention may realize an electric vehicle driving mode EV mode with three shift states, or a torque splitting mode I/S with three shift states, parallel driving mode P (i.e., engine driving mode as well as hybrid driving mode) with six shift states, depending on operation conditions of the first clutch and second clutch C1 and C2, the first to fourth brakes BK1 to BK4 and the first and second motor/generators MG1 and MG2.

[EV 1]

For the EV1 mode, the engine ENG is stopped, and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is input to the second shifting section FTM through the third and fourth shafts TM3 and TM4.

And, in the second shifting section FTM, by the operation of the fourth brake B4, the sixth shaft TM6 acts as a fixed element. in the instant state, the torque of the second motor/generator MG2 is input through the fourth shaft TM4, and therefore, the third planetary gear set PG3 outputs a reduced rotation speed through the fifth shaft TM5, realizing the EV1 mode.

[EV 2]

For the EV 2, the engine ENG is stopped, and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is input to the second shifting section FTM through the third and fourth shafts TM3 and TM4.

In the second shifting section FTM, by the operation of the third brake B3, the seventh shaft TM7 acts as a fixed element. in the instant state, the torque of the second motor/generator MG2 is input through the fourth shaft TM4, and therefore, the third planetary gear set PG3 outputs a reduced rotation speed through the fifth shaft TM5, realizing the EV2 mode.

[EV 3]

For the EV 3, the engine ENG is stopped, and the second brake B2 and the second clutch C2 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is input to the second shifting section FTM through the third and fourth shafts TM3 and TM4.

In the second shifting section FTM, by the operation of the second clutch C2, the second and third planetary gear sets PG2 and PG3 integrally rotate. in the instant state, the torque of the second motor/generator MG2 is input through the fourth shaft TM4, and therefore, the third planetary gear set PG3 outputs as inputted through the fifth shaft TM5, realizing the EV3 mode.

On the other hand, in the above description of the EV driving mode, the second motor/generator MG2 is driven, but it may be realized by driving the first motor/generator MG1 while the second brake B2 is not operated.

[Torque Splitting Mode I/S 1]

In the torque splitting mode I/S 1, the fourth brake B4 is operated.

In the second shifting section FTM, by the operation of the fourth brake B4, the sixth shaft TM6 acts as a fixed element. and the input torque through the fourth shaft TM4 is reduced in rotation speed and output through the fifth shaft TM5, realizing the torque splitting mode I/S 1.

In the instant case, the torque inputted to the fourth shaft TM4 is a combined torque of the torque of the engine and the torque of the first motor/generator MG1 in the first shifting section PS.

[Torque Splitting Mode I/S 2]

In the torque splitting mode I/S 2, the third brake B3 is operated.

In the second shifting section FTM, by the operation of the third brake B3, the seventh shaft TM7 acts as a fixed element. in the instant state, the input torque through the fourth shaft TM4 is reduced in rotation speed and output through the fifth shaft TM5, realizing the torque splitting mode I/S 2.

In the instant case, the torque inputted to the fourth shaft TM4 is a combined torque of the torque of the engine and the torque of the first motor/generator MG1 in the first shifting section PS.

[Torque Splitting Mode I/S 3]

In the torque splitting mode I/S 3, the second clutch C2 is operated.

In the second shifting section FTM, by the operation of the second clutch C2, the second and third planetary gear sets PG2 and PG3 integrally rotate. and the input torque transferred to the fourth shaft TM4 is output through the fifth shaft TM5 as inputted, realizing the torque splitting mode I/S 3.

In the instant case, the torque inputted to the fourth shaft TM4 is a combined torque of the torque of the engine and the torque of the first motor/generator MG1 in the first shifting section PS.

In the parallel mode P, the vehicle may be driven in a hybrid driving mode HEV by the torque of the engine ENG and the torque of the first and second motor/generators MG1 and MG2, and may also be driven solely by the torque of the engine ENG.

[Parallel Mode First Speed P1]

In the parallel mode first speed P1, the first clutch C1 and the fourth brake B4 are operated.

In the first shifting section PS, by the operation of the first clutch C1, the first planetary gear set PG1 integrally rotates. in the instant state, the torque of the input shaft IS is transferred as it is to the second shifting section FTM through the third and fourth shafts TM3 and TM4.

In the second shifting section FTM, by the operation of the fourth brake B4, the sixth shaft TM6 acts as a fixed element. in the instant state, the torque of the third shaft TM3 is input through the fourth shaft TM4, and therefore, the third planetary gear set PG3 outputs a reduced rotation speed through the fifth shaft TM5, realizing the parallel mode first speed P1.

[Parallel Mode Second Speed P2]

In the parallel mode second speed P2, the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed to the second shifting section FTM though the third and fourth shafts TM3 and TM4.

In the second shifting section FTM, by the operation of the fourth brake B4, the sixth shaft TM6 acts as a fixed element. in the instant state, the torque of the third shaft TM3 is input through the fourth shaft TM4, and therefore, the third planetary gear set PG3 outputs a reduced rotation speed through the fifth shaft TM5, realizing the parallel mode second speed P2.

[Parallel Mode Third Speed P3]

In the parallel mode third speed P3, the first clutch C1 and the third brake B3 are operated.

In the first shifting section PS, by the operation of the first clutch C1, the first planetary gear set PG1 integrally rotates. in the instant state, the torque of the input shaft IS is transferred as it is to the second shifting section FTM through the third and fourth shafts TM3 and TM4.

In the second shifting section FTM, by the operation of the third brake B3, the seventh shaft TM7 acts as a fixed element. in the instant state, the torque of the third shaft TM3 is input through the fourth shaft TM4, and therefore, the third planetary gear set PG3 outputs a reduced rotation speed through the fifth shaft TM5, realizing the parallel mode third speed P3.

[Parallel Mode Fourth Speed P4]

In the parallel mode fourth speed P4, the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed to the second shifting section FTM though the third and fourth shafts TM3 and TM4.

In the second shifting section FTM, by the operation of the third brake B3, the seventh shaft TM7 acts as a fixed element. in the instant state, the torque of the third shaft TM3 is input through the fourth shaft TM4, and therefore, the third planetary gear set PG3 outputs a reduced rotation speed through the fifth shaft TM5, realizing the parallel mode fourth speed P4.

[Parallel Mode Fifth Speed P5]

In the parallel mode fifth speed P5, the first clutch and second clutch C1 and C2 are operated.

In the first shifting section PS, by the operation of the first clutch C1, the first planetary gear set PG1 integrally rotates. in the instant state, the torque of the input shaft IS is transferred as it is to the second shifting section FTM through the third and fourth shafts TM3 and TM4.

In the second shifting section FTM, by the operation of the second clutch C2, the second and third planetary gear sets PG2 and PG3 integrally rotate. and the input torque through the fourth shaft TM4 is output through the fifth shaft TM5 as inputted, realizing the parallel mode the fifth speed P5.

[Parallel Mode Sixth Speed P6]

In the parallel mode sixth speed P6, the second clutch C2 and the first brake B1 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed to the second shifting section FTM though the third and fourth shafts TM3 and TM4.

In the second shifting section FTM, by the operation of the second clutch C2, the second and third planetary gear sets PG2 and PG3 integrally rotate. and the input torque through the fourth shaft TM4 is output through the fifth shaft TM5 as inputted, realizing the parallel mode the sixth speed P6.

Reverse speeds not described above may be implemented by reversed rotating the first motor/generator MG1 or the second motor/generator MG2.

Figure 3:
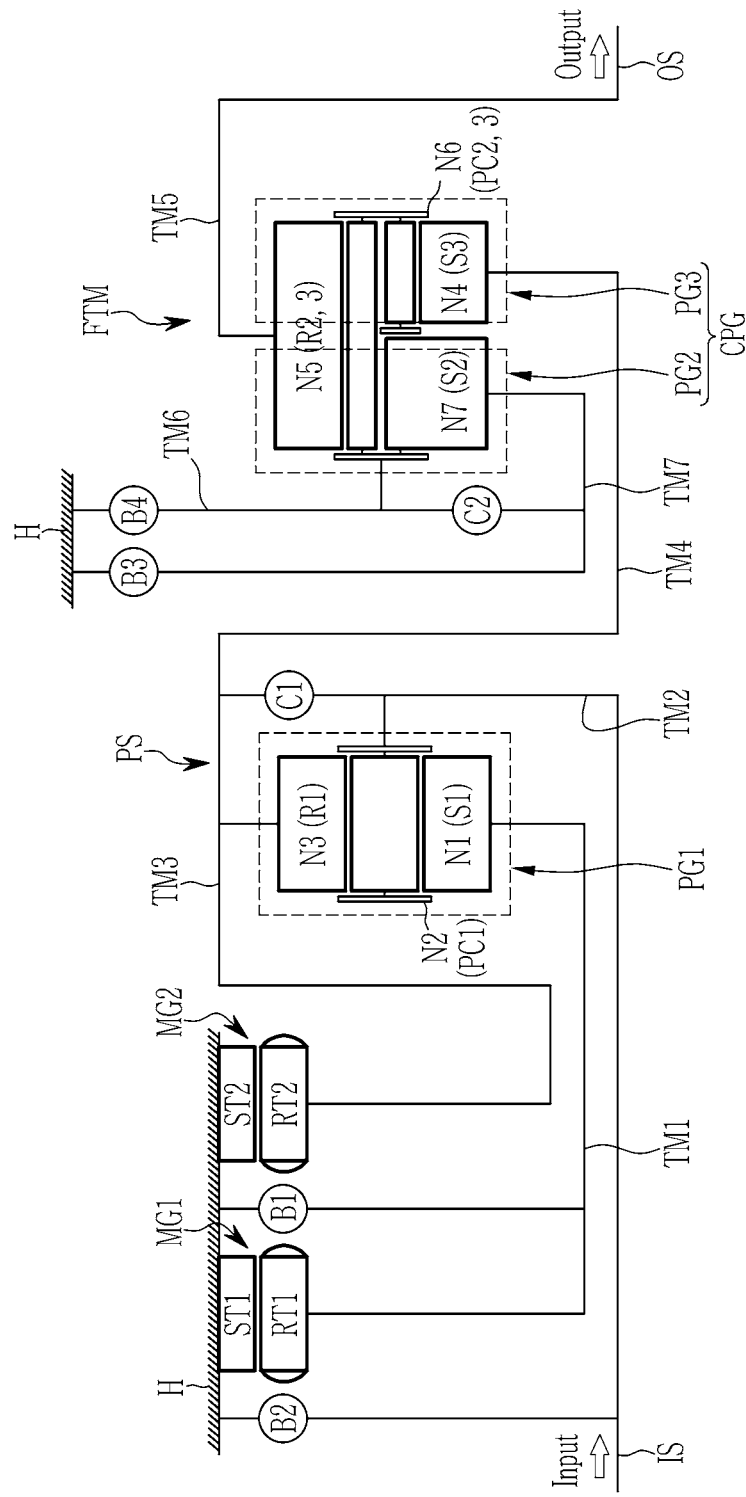
FIG. 3 is a schematic diagram of a power transmission apparatus of a hybrid electric vehicle according to various exemplary embodiments of the present invention.

FIG. 3 is a schematic diagram of a power transmission apparatus of a hybrid electric vehicle according to various exemplary embodiments of the present invention.

In comparison with a power transmission apparatus of the various exemplary embodiments shown in FIG. 1 that employs the second and third planetary gear sets PG2 and PG3 forming the second shifting section FTM as the single pinion planetary gear sets, various exemplary embodiments of FIG. 3 employs a compound planetary gear set CPG having a second planetary gear set PG2 as a single pinion planetary gear set and a third planetary gear set PG3 as a double pinion planetary gear set.

That is, the second and third planetary gear sets PG2 and PG3 shares a ring gear and a planet carrier, and thereby the compound planetary gear set CPG is formed as a Ravingneaux type planetary gear set.

The second planetary gear set PG2 includes a second sun gear S2, a common planet carrier PC2, 3, and a common ring gear R2, 3, and the third planetary gear set PG3 includes a third sun gear S3, the common planet carrier PC2, 3, and the common ring gear R2, 3. The compound planetary gear set CPG forms fourth, fifth, sixth and seventh rotation element N4, N5, N6 and N7 as the third sun gear S3, the common ring gear R2, 3, the common planet carrier PC2, 3 and the second sun gear S2 respectively.

The fourth, fifth, sixth and seventh rotation elements N4, N5, N6 and N7 are connected to the fourth, fifth, sixth and seventh shafts TM4, TM5, TM6 and TM7 independently as in the various exemplary embodiments.

The various exemplary embodiments of FIG. 3 merely differ from the various exemplary embodiments of FIG. 1 having fourth, fifth, sixth and seventh rotation elements N4, N5, N6 and N7, which is therefore not described in further detail.

Figure 4:
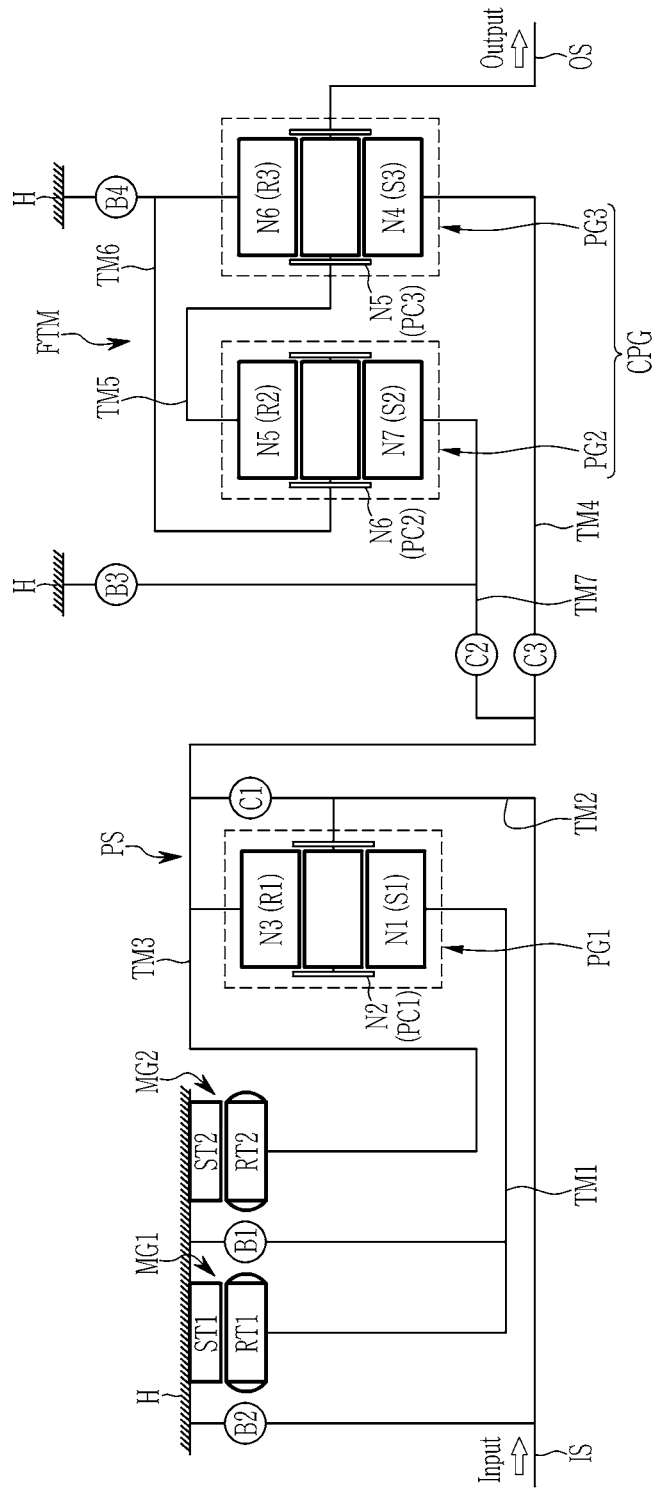
FIG. 4 is a schematic diagram of a power transmission apparatus of a hybrid electric vehicle according to various exemplary embodiments of the present invention.

FIG. 4 is a schematic diagram of a power transmission apparatus of a hybrid electric vehicle according to various exemplary embodiments of the present invention.

In comparison with the power transmission apparatus of the various exemplary embodiments shown in FIG. 1 that employs the second clutch C2 disposed between the fifth shaft TM5 and the sixth shaft TM6, a power transmission apparatus of various exemplary embodiments of FIG. 4 further includes a third clutch C3, and the second clutch C2 is disposed between the third shaft TM3 and the seventh shaft TM7 and the third clutch C3 is disposed between the third shaft TM3 and the fourth shaft TM4.

The various exemplary embodiments of FIG. 4 merely differ from the various exemplary embodiments of FIG. 1 of the position of the second clutch C2 and the added third clutch C3, which is therefore not described in further detail.

FIG. 5 is a shifting operation chart of a power transmission apparatus of a hybrid electric vehicle according to various exemplary embodiments of the present invention.

Referring to FIG. 5, a power transmission apparatus of a hybrid electric vehicle according to various exemplary embodiments of the present invention may realize an electric vehicle driving mode EV mode with three shift states, or a torque splitting mode I/S with three shift states, parallel driving mode P (i.e., engine driving mode as well as hybrid driving mode) with six shift states and four reverse modes REV.

[EV 1]

For the EV1 mode, the engine ENG is stopped, and the third clutch C3 and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

And, in the second shifting section FTM, by the operation of the fourth brake B4, the sixth shaft TM6 acts as a fixed element. in the instant state, by the operation of the third clutch C3, the torque of the second motor/generator MG2 is input through the fourth shaft TM4, and therefore, the third planetary gear set PG3 outputs a reduced rotation speed through the fifth shaft TM5, realizing the EV1 mode.

[EV 2]

For the EV 2, the engine ENG is stopped, and the third clutch C3 and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the third brake B3, the seventh shaft TM7 acts as a fixed element. in the instant state, the torque of the second motor/generator MG2 is output through the third and fourth shafts TM3 and TM4, and therefore, the third planetary gear set PG3 outputs a reduced rotation speed through the fifth shaft TM5, realizing the EV2 mode.

[EV 3]

For the EV 3, the engine ENG is stopped, and the second brake B2 and the second and third clutches C2 and C3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operations of the second and third clutches C2 and C3, the torque of the third shaft TM3 is transferred to the fourth shaft TM4 and the seventh shaft TM7 so that the second and third planetary gear sets PG2 and PG3 integrally rotate. and the input torque transferred the fourth shaft TM4 and the seventh shaft TM7 is output through the fifth shaft TM5 as inputted, realizing the EV3 mode.

On the other hand, in the above description of the EV driving mode, the second motor/generator MG2 is driven, but it may be realized by driving the first motor/generator MG1 while the second brake B2 is not operated.

[Torque Splitting Mode I/S 1]

In the torque splitting mode I/S 1, the third clutch C3 and the fourth brake B4 are operated.

In the second shifting section FTM, by the operation of the fourth brake B4, the sixth shaft TM6 acts as a fixed element. By the operation of the third clutch C3, the torque of the third shaft TM3 is transferred to the fourth shaft TM4 and is output through the fifth shaft TM5 in reduced rotation speed, realizing the torque splitting mode I/S 1.

In the instant case, the torque inputted to the third shaft TM3 is a combined torque of the torque of the engine and the torque of the first motor/generator MG1 in the first shifting section PS.

[Torque Splitting Mode I/S 2]

In the torque splitting mode I/S 2, the third clutch C3 and the third brake B3 are operated.

In the second shifting section FTM, by the operation of the third brake B3, the seventh shaft TM7 acts as a fixed element. in the instant state, by the operation of the third clutch C3, the torque of the third shaft TM3 is transferred to the fourth shaft TM4 and is output through the fifth shaft TM5 in reduced rotation speed, realizing the torque splitting mode I/S 2.

In the instant case, the torque inputted to the third shaft TM3 is a combined torque of the torque of the engine and the torque of the first motor/generator MG1 in the first shifting section PS.

[Torque Splitting Mode I/S 3]

In the torque splitting mode I/S 3, the second and third clutches C2 and C3 are operated.

In the second shifting section FTM, by the operations of the second and third clutches C2 and C3, the torque of the third shaft TM3 is transferred to the fourth shaft TM4 and the seventh shaft TM7 so that the second and third planetary gear sets PG2 and PG3 integrally rotate. and the input torque transferred the fourth shaft TM4 and the seventh shaft TM7 is output through the fifth shaft TM5 as inputted, realizing the torque splitting mode I/S 3.

In the instant case, the torque inputted to the third shaft TM3 is a combined torque of the torque of the engine and the torque of the first motor/generator MG1 in the first shifting section PS.

In the parallel mode P, the vehicle may be driven in a hybrid driving mode HEV by the torque of the engine ENG and the torque of the first and second motor/generators MG1 and MG2, and may also be driven solely by the torque of the engine ENG.

[Parallel Mode First Speed P1]

In the parallel mode first speed P1, the first and third clutches C1 and C3 and the fourth brake B4 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the fourth brake B4, the sixth shaft TM6 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode first speed P1.

[Parallel Mode Second Speed P2]

In the parallel mode second speed P2, the third clutch C3 and the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed through the third shaft TM3.

In the second shifting section FTM, by the operation of the fourth brake B4, the sixth shaft TM6 acts as a fixed element. in the instant state, by the operation of the third clutch C3, the torque of the third shaft TM3 is transferred to the fourth shaft TM4 and is output through the fifth shaft TM5 in reduced rotation speed, realizing the parallel mode second speed P2.

[Parallel Mode Third Speed P3]

In the parallel mode the third speed P3, the first and third clutches C1 and C3 and the third brake B3 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the third brake B3, the seventh shaft TM7 acts as a fixed element. in the instant state, by the operation of the third clutch C3, the torque of the third shaft TM3 is transferred to the fourth shaft TM4 and is output through the fifth shaft TM5 in reduced rotation speed, realizing the parallel mode third speed P3.

[Parallel Mode Fourth Speed P4]

In the parallel mode fourth speed P4, the third clutch C3 and the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operation of the third brake B3, the seventh shaft TM7 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode fourth speed P4.

[Parallel Mode Fifth Speed P5]

In the parallel mode fifth speed P5, the first, second, and third clutches C1, C2, and C3 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the second and third clutches C2 and C3, the torque of the third shaft TM3 is transferred to the fourth shaft TM4 and the seventh shaft TM7 so that the second and third planetary gear sets PG2 and PG3 integrally rotate. and the input torque transferred the fourth shaft TM4 and the seventh shaft TM7 is output through the fifth shaft TM5 as inputted, realizing the parallel mode the fifth speed P5.

[Parallel Mode Sixth Speed P6]

In the parallel mode sixth speed P6, the second and third clutches C2 and C3 and the first brake B1 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the second and third clutches C2 and C3, the torque of the third shaft TM3 is transferred to the fourth shaft TM4 and the seventh shaft TM7 so that the second and third planetary gear sets PG2 and PG3 integrally rotate. and the input torque transferred the fourth shaft TM4 and the seventh shaft TM7 is output through the fifth shaft TM5 as inputted, realizing the parallel mode the sixth speed P6.

On the other hand, the reverse speed REV in the various exemplary embodiments may include four patterns by electric vehicle mode EV1, torque splitting mode (I/S 1), and parallel modes P1 and P2.

[Reverse REV EV 1]

In the reverse REV EV 1, the engine ENG is stopped, and the second clutch C2 and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the second clutch C2, the torque of the third shaft TM3 is input to the seventh shaft TM7. in the instant state, by the operation of the fourth brake B4, the sixth shaft TM6 acts as a fixed element and thus reversed rotation speed is output through the fifth shaft TM5, realizing the reverse REV EV1.

On the other hand, in the above description of the reverse REV EV1, the second motor/generator MG2 is driven, but it may be realized by driving the first motor/generator MG1 while the second brake B2 is not operated.

[Reverse REV Torque Splitting Mode I/S 1]

In the REV torque splitting mode I/S 1, the second clutch C2 and the fourth brake B4 are operated.

In the second shifting section FTM, by the operation of the fourth brake B4, the sixth shaft TM6 acts as a fixed element. in the instant state, by the operation of the second clutch C2, the torque of seventh shaft TM7 is output through the fifth shaft TM5 in reversed direction thereof, realizing the reverse torque splitting mode I/S 1.

In the instant case, the torque inputted to the fourth shaft TM4 is a combined torque of the torque of the engine and the torque of the first motor/generator MG1 in the first shifting section PS.

[Reverse REV Parallel Mode First Speed P1]

In the reverse REV parallel mode first speed P1, the first clutch and second clutch C1 and C2 and the fourth brake B4 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the second clutch C2, the torque of the third shaft TM3 is transferred to the seventh shaft TM7. in the instant state, by the operation of the fourth brake B4, the sixth shaft TM6 acts as a fixed element. Thus, the torque of the fifth shaft TM5 is output in reversed rotation speed, realizing the reverse REV parallel mode first speed P1.

[Reverse REV Parallel Mode Second Speed P2]

In the reverse REV parallel mode second speed P2, the second clutch C2 and the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the second clutch C2, the torque of the third shaft TM3 is transferred to the seventh shaft TM7. in the instant state, by the operation of the fourth brake B4, the sixth shaft TM6 acts as a fixed element. Thus, the torque of the fifth shaft TM5 is output in reversed direction thereof, realizing the reverse REV parallel mode second speed P2.

Figure 6:
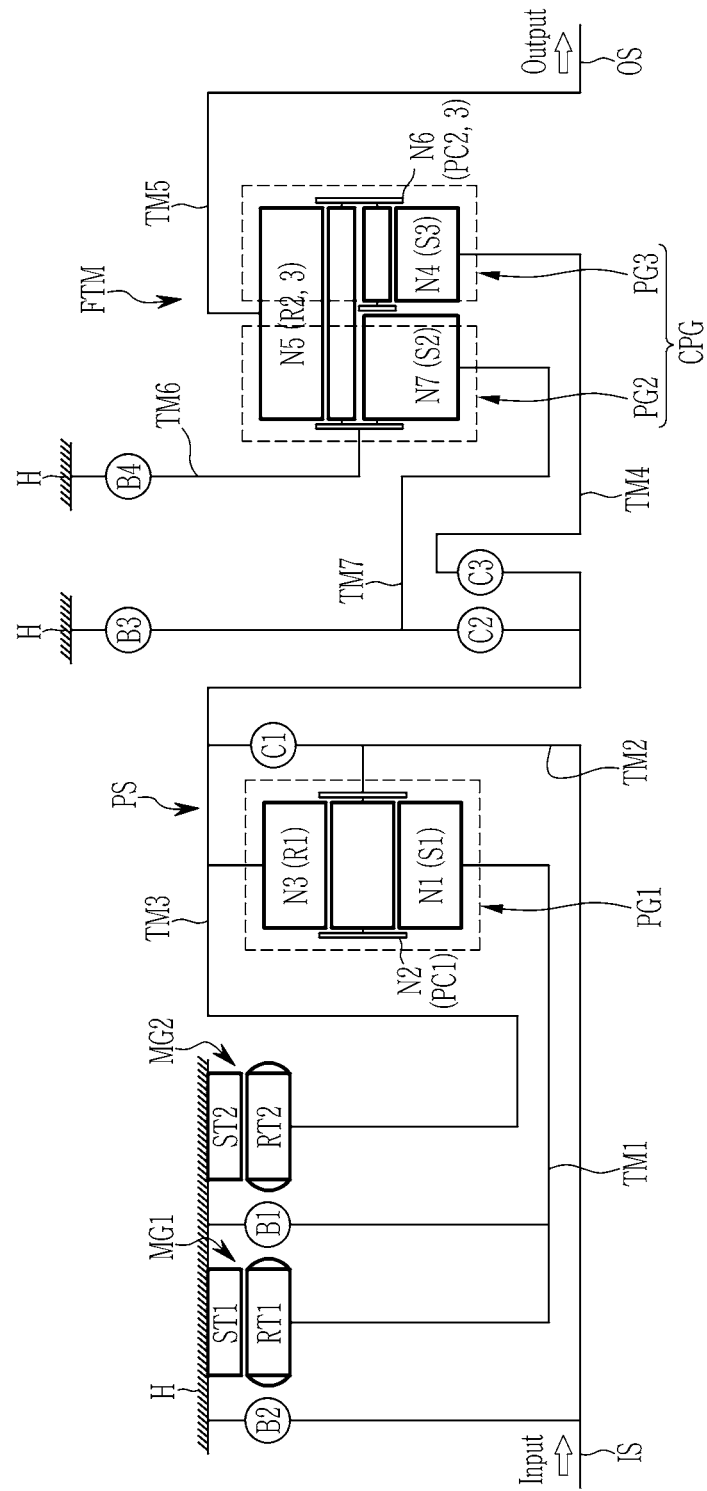
FIG. 6 is a schematic diagram of a power transmission apparatus of a hybrid electric vehicle according to various exemplary embodiments of the present invention.

FIG. 6 is a schematic diagram of a power transmission apparatus of a hybrid electric vehicle according to various exemplary embodiments of the present invention.

In comparison with a power transmission apparatus of the various exemplary embodiments shown in FIG. 4 that employs the second and third planetary gear sets PG2 and PG3 forming the second shifting section FTM as the single pinion planetary gear sets, various exemplary embodiments employs a compound planetary gear set CPG having a second planetary gear set PG2 as a single pinion planetary gear set and a third planetary gear set PG3 as a double pinion planetary gear set.

That is, the second and third planetary gear sets PG2 and PG3 shares a ring gear and a planet carrier, and thereby the compound planetary gear set CPG is formed as a Ravingneaux type planetary gear set.

The second planetary gear set PG2 includes a second sun gear S2, a common planet carrier PC2, 3, and a common ring gear R2, 3, and the third planetary gear set PG3 includes a third sun gear S3, the common planet carrier PC2, 3, and the common ring gear R2, 3. The compound planetary gear set CPG forms fourth, fifth, sixth and seventh rotation element N4, N5, N6 and N7 as the third sun gear S3, the common ring gear R2, 3, the common planet carrier PC2, 3 and the second sun gear S2 respectively.

The fourth, fifth, sixth and seventh rotation elements N4, N5, N6 and N7 are connected to the fourth, fifth, sixth and seventh shafts TM4, TM5, TM6 and TM7 independently as in the various exemplary embodiments.

The various exemplary embodiments of FIG. 6 merely differ from the various exemplary embodiments of FIG. 4 of fourth, fifth, sixth and seventh rotation elements N4, N5, N6 and N7, which is therefore not described in further detail.

Figure 7:
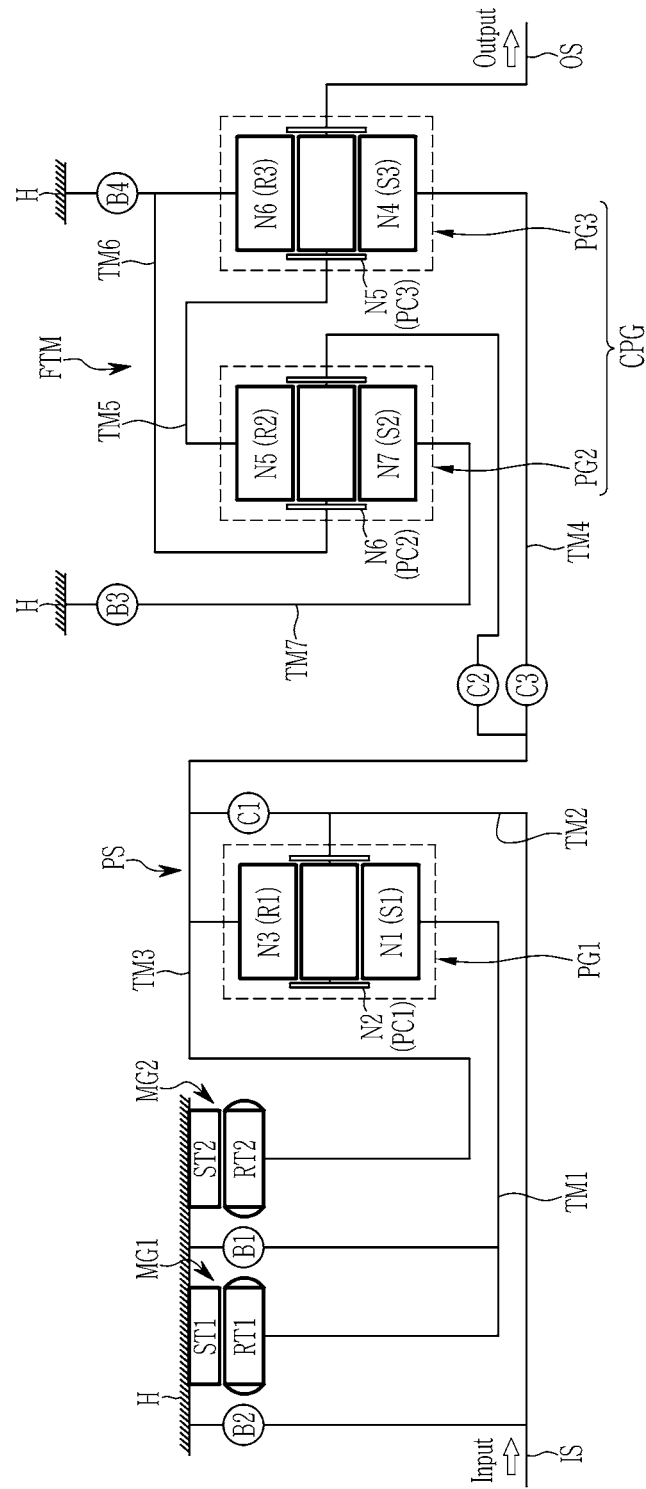
FIG. 7 is a schematic diagram of a power transmission apparatus of a hybrid electric vehicle according to various exemplary embodiments of the present invention.

FIG. 7 is a schematic diagram of a power transmission apparatus of a hybrid electric vehicle according to various exemplary embodiments of the present invention.

In comparison with the power transmission apparatus of the various exemplary embodiments shown in FIG. 4 that employs the second clutch C2 disposed between the third shaft TM3 and the seventh shaft TM7, a power transmission apparatus of various exemplary embodiments of FIG. 7 employs a second clutch C2 disposed between the third shaft TM3 and the sixth shaft TM6.

The various exemplary embodiments of FIG. 7 merely differ from the various exemplary embodiments of FIG. 4 of the position of the second clutch C2, which is therefore not described in further detail.

FIG. 8 is a shifting operation chart of a power transmission apparatus of a hybrid electric vehicle according to various exemplary embodiments of the present invention.

Referring to FIG. 8, a power transmission apparatus of a hybrid electric vehicle according to various exemplary embodiments of the present invention may realize an electric vehicle driving mode EV mode with four shift states, or a torque splitting mode I/S with four shift states, parallel driving mode P (i.e., engine driving mode as well as hybrid driving mode) with eight shift states.

[EV 1]

For the EV1 mode, the engine ENG is stopped, and the third clutch C3 and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

And, in the second shifting section FTM, by the operation of the fourth brake B4, the sixth shaft TM6 acts as a fixed element. in the instant state, by the operation of the third clutch C3, the torque of the second motor/generator MG2 is input through the fourth shaft TM4, and therefore, the third planetary gear set PG3 outputs a reduced rotation speed through the fifth shaft TM5, realizing the EV1 mode.

[EV 2]

For the EV 2, the engine ENG is stopped, and the third clutch C3 and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the third brake B3, the seventh shaft TM7 acts as a fixed element. in the instant state, the torque of the second motor/generator MG2 is output through the third and fourth shafts TM3 and TM4, and therefore, the third planetary gear set PG3 outputs a reduced rotation speed through the fifth shaft TM5, realizing the EV2 mode.

[EV 3]

For the EV 3, the engine ENG is stopped, and the second brake B2 and the second and third clutches C2 and C3 are operated while the second motor/generator MG2 is driven.

For the EV 3, the engine ENG is stopped, and the second brake B2 and the second and third clutches C2 and C3 are operated while the second motor/generator MG2 is driven.

In the second shifting section FTM, by the operations of the second and third clutches C2 and C3, the torque of the third shaft TM3 is transferred to the fourth shaft TM4 and the sixth shaft TM6 so that the second and third planetary gear sets PG2 and PG3 integrally rotate. and the input torque transferred the fourth shaft TM4 and the sixth shaft TM6 is output through the fifth shaft TM5 as inputted, realizing the EV3 mode.

[EV 4]

For the EV 4, the engine ENG is stopped, and the second clutch C2 and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the second clutch C2, the torque of the third shaft TM3 is input to the sixth shaft TM6 and by the operation of the third brake B3, the seventh shaft TM7 acts as a fixed element. Therefore, the third planetary gear set PG3 outputs an increased rotation speed through the fifth shaft TM5, realizing the EV4 mode.

On the other hand, in the above description of the EV driving mode, the second motor/generator MG2 is driven, but it may be realized by driving the first motor/generator MG1 while the second brake B2 is not operated.

[Torque Splitting Mode I/S 1]

In the torque splitting mode I/S 1, the third clutch C3 and the fourth brake B4 are operated.

In the second shifting section FTM, by the operation of the fourth brake B4, the sixth shaft TM6 acts as a fixed element. and by the operation of the third clutch C3, the torque of the third shaft TM3 is input through the fourth shaft TM4, is reduced in rotation speed and outputs through the fifth shaft TM5, realizing the torque splitting mode I/S 1.

In the instant case, the torque inputted to the third shaft TM3 is a combined torque of the torque of the engine and the torque of the first motor/generator MG1 in the first shifting section PS.

[Torque Splitting Mode I/S 2]

In the torque splitting mode I/S 2, the third clutch C3 and the third brake B3 are operated.

In the second shifting section FTM, by the operation of the third brake B3, the seventh shaft TM7 acts as a fixed element. in the instant state, by the operation of the third clutch C3, the torque of the third shaft TM3 is input through the fourth shaft TM4, is reduced in rotation speed and outputs through the fifth shaft TM5, realizing the torque splitting mode I/S 2.

In the instant case, the torque inputted to the third shaft TM3 is a combined torque of the torque of the engine and the torque of the first motor/generator MG1 in the first shifting section PS.

[Torque Splitting Mode I/S 3]

In the torque splitting mode I/S 3, the second and the third clutch C2 and C3 are operated.

In the second shifting section FTM, by the operations of the second and third clutches C2 and C3, the torque of the third shaft TM3 is transferred to the fourth shaft TM4 and the sixth shaft TM6 so that the second and third planetary gear sets PG2 and PG3 integrally rotate. and the input torque transferred the fourth shaft TM4 and the sixth shaft TM6 is output through the fifth shaft TM5 as inputted, realizing the torque splitting mode I/S 3.

In the instant case, the torque inputted to the third shaft TM3 is a combined torque of the torque of the engine and the torque of the first motor/generator MG1 in the first shifting section PS.

[Torque Splitting Mode I/S 4]

In the torque splitting mode I/S 4, the second clutch C2 and the third brake B3 are operated.

In the second shifting section FTM, by the operations of the second clutch C2, the torque of the third shaft TM3 is input to the sixth shaft TM6. in the instant state, by the operation of the third brake B3 the seventh shaft TM7 acts as a fixed element. Thus the torque is output through the fifth shaft TM5 in increased rotation speed, realizing the torque splitting mode I/S 4.

In the instant case, the torque inputted to the sixth shaft TM6 is a combined torque of the torque of the engine and the torque of the first motor/generator MG1 in the first shifting section PS.

In the parallel mode P, the vehicle may be driven in a hybrid driving mode HEV by the torque of the engine ENG and the torque of the first and second motor/generators MG1 and MG2, and may also be driven solely by the torque of the engine ENG.

[Parallel Mode First Speed P1]

In the parallel mode first speed P1, the first and third clutches C1 and C3 and the fourth brake B4 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the fourth brake B4, the sixth shaft TM6 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode first speed P1.

[Parallel Mode Second Speed P2]

In the parallel mode second speed P2, the third clutch C3 and the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed through the third shaft TM3.

In the second shifting section FTM, by the operation of the fourth brake B4, the sixth shaft TM6 acts as a fixed element. in the instant state, by the operation of the third clutch C3, the torque of the third shaft TM3 is transferred to the fourth shaft TM4 and is output through the fifth shaft TM5 in reduced rotation speed, realizing the parallel mode second speed P2.

[Parallel Mode Third Speed P3]

In the parallel mode the third speed P3, the first and third clutches C1 and C3 and the third brake B3 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the third brake B3, the seventh shaft TM7 acts as a fixed element. in the instant state, by the operation of the third clutch C3, the torque of the third shaft TM3 is transferred to the fourth shaft TM4, and is output through the fifth shaft TM5 in reduced rotation speed, realizing the parallel mode third speed P3.

[Parallel Mode Fourth Speed P4]

In the parallel mode fourth speed P4, the third clutch C3 and the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operation of the third brake B3, the seventh shaft TM7 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode fourth speed P4.

[Parallel Mode Fifth Speed P5]

In the parallel mode fifth speed P5, the first, second, and third clutches C1, C2, and C3 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the second and third clutches C2 and C3, the torque of the third shaft TM3 is transferred to the fourth shaft TM4 and the sixth shaft TM6 so that the second and third planetary gear sets PG2 and PG3 integrally rotate. and the input torque transferred the fourth shaft TM4 and the sixth shaft TM6 is output through the fifth shaft TM5 as inputted, realizing the parallel mode the fifth speed P5.

[Parallel Mode Sixth Speed P6]

In the parallel mode sixth speed P6, the second and third clutches C2 and C3 and the first brake B1 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the second and third clutches C2 and C3, the torque of the third shaft TM3 is transferred to the fourth shaft TM4 and the sixth shaft TM6 so that the second and third planetary gear sets PG2 and PG3 integrally rotate. and the input torque transferred the fourth shaft TM4 and the sixth shaft TM6 is output through the fifth shaft TM5 as inputted, realizing the parallel mode the sixth speed P6.

[Parallel Mode Seventh Speed P7]

In the parallel mode seventh speed P7, the first clutch and second clutch C1 and C2 and the third brake B3 are operated.

In the first shifting section PS, by the operation of first clutch C1, the first planetary gear set PG1 integrally rotates, thus the torque of the input shaft IS is input to the third shaft TM3 as inputted.

In the second shifting section FTM, by the operations of the second clutch C2, the torque of the third shaft TM3 is transferred to the sixth shaft TM6 and the seventh shaft TM7 acts as a fixed element by the operation of the third brake B3. and therefore, the third planetary gear set PG3 outputs an increased rotation speed through the fifth shaft TM5, realizing the parallel mode seventh speed P7.

[Parallel Mode Eighth Speed P8]

In the parallel mode the sixth speed P6, the second clutch C2 and the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the second clutch C2, the torque of the third shaft TM3 is transferred to the sixth shaft TM6, and the seventh shaft TM7 acts as a fixed element by the operation of the third brake B3. and therefore, the third planetary gear set PG3 outputs an increased rotation speed through the fifth shaft TM5, realizing the parallel mode eighth speed P8.

Reverse speeds not described above may be implemented by reversed rotating the first motor/generator MG1 or the second motor/generator MG2.

Figure 9:
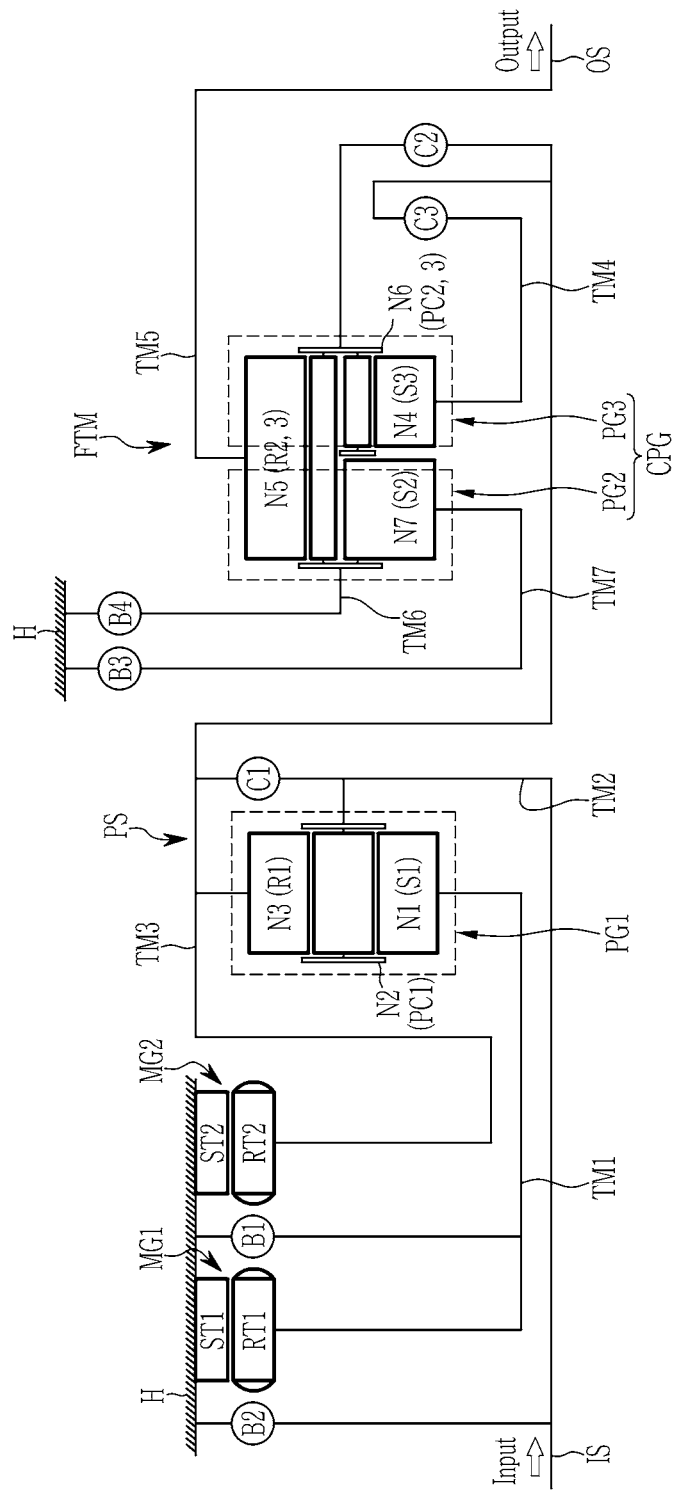
FIG. 9 is a schematic diagram of a power transmission apparatus of a hybrid electric vehicle according to various exemplary embodiments of the present invention.

FIG. 9 is a schematic diagram of a power transmission apparatus of a hybrid electric vehicle according to various exemplary embodiments of the present invention.

In comparison with a power transmission apparatus of the various exemplary embodiments shown in FIG. 7 that employs the second and third planetary gear sets PG2 and PG3 forming the second shifting section FTM as the single pinion planetary gear sets, various exemplary embodiments employs a compound planetary gear set CPG having a second planetary gear set PG2 as a single pinion planetary gear set and a third planetary gear set PG3 as a double pinion planetary gear set.

That is, the second and third planetary gear sets PG2 and PG3 shares a ring gear and a planet carrier, and thereby the compound planetary gear set CPG is formed as a Ravingneaux type planetary gear set.

The second planetary gear set PG2 includes a second sun gear S2, a common planet carrier PC2, 3, and a common ring gear R2, 3, and the third planetary gear set PG3 includes a third sun gear S3, the common planet carrier PC2, 3, and the common ring gear R2, 3. The compound planetary gear set CPG forms fourth, fifth, sixth and seventh rotation element N4, N5, N6 and N7 as the third sun gear S3, the common ring gear R2, 3, the common planet carrier PC2, 3 and the second sun gear S2 respectively.

The fourth, fifth, sixth and seventh rotation elements N4, N5, N6 and N7 are connected to the fourth, fifth, sixth and seventh shafts TM4, TM5, TM6 and TM7 independently as in the various exemplary embodiments.

The various exemplary embodiments of FIG. 9 merely differ from the various exemplary embodiments of FIG. 7 of fourth, fifth, sixth and seventh rotation elements N4, N5, N6 and N7, which is therefore not described in further detail.

Figure 10:
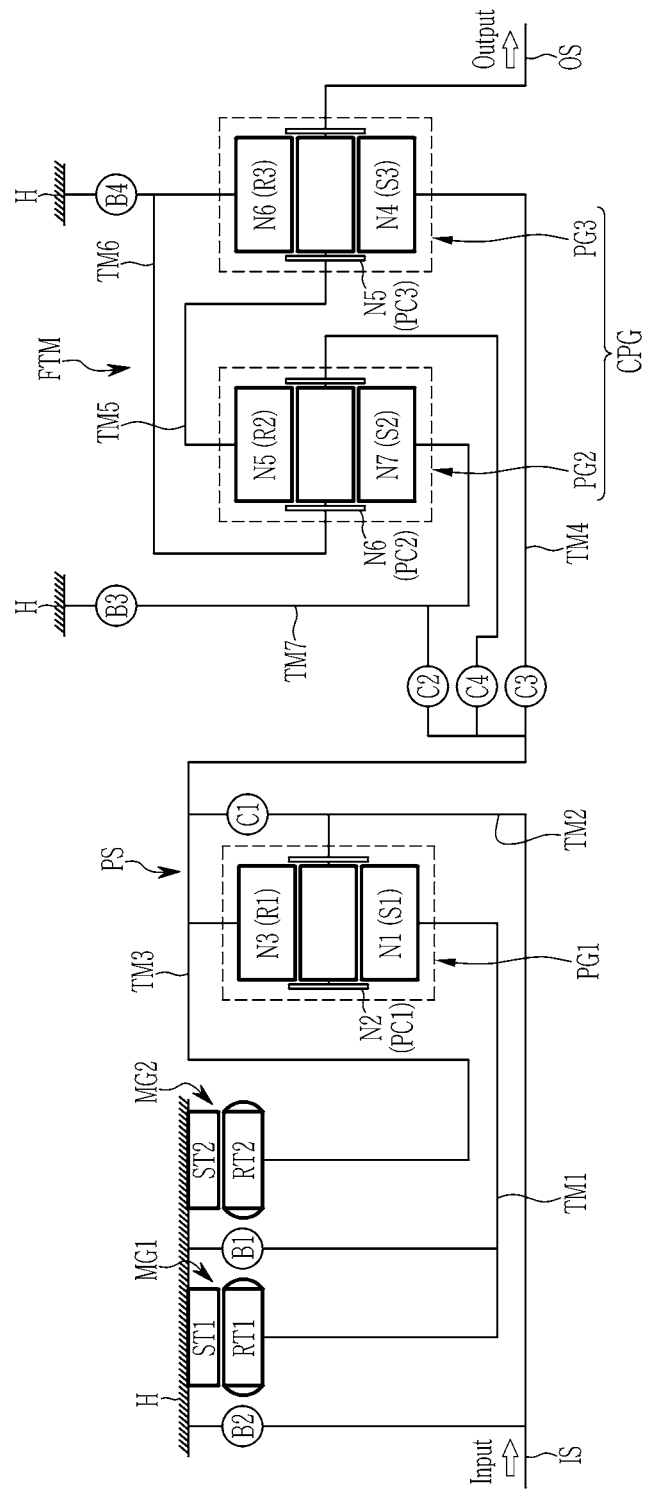
FIG. 10 is a schematic diagram of a power transmission apparatus of a hybrid electric vehicle according to various exemplary embodiments of the present invention.

FIG. 10 is a schematic diagram of a power transmission apparatus of a hybrid electric vehicle according to various exemplary embodiments of the present invention.

In comparison with the power transmission apparatus of the various exemplary embodiments shown in FIG. 7, a power transmission apparatus of various exemplary embodiments employs a fourth clutch C4.

Furthermore, in the various exemplary embodiments of the present invention, a second clutch C2 is disposed between the third shaft TM3 and the seventh shaft TM7, a third clutch C3 is disposed between the third shaft TM3 and the fourth shaft TM4 and the fourth clutch C4 is disposed between the third shaft TM3 and the sixth shaft TM6.

The various exemplary embodiments of FIG. 10 merely differ from the various exemplary embodiments of FIG. 7 of the position of the second clutch C2 and the added third clutch C4, which is therefore not described in further detail.

FIG. 11 is a shifting operation chart of a power transmission apparatus of a hybrid electric vehicle according to various exemplary embodiments of the present invention.

Referring to FIG. 11, a power transmission apparatus of a hybrid electric vehicle according to various exemplary embodiments of the present invention may realize an electric vehicle driving mode EV mode with four shift states, or a torque splitting mode I/S with four shift states, parallel driving mode P (i.e., engine driving mode as well as hybrid driving mode) with eight shift states.

[EV 1]

For the EV1 mode, the engine ENG is stopped, and the third clutch C3 and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

And, in the second shifting section FTM, by the operation of the fourth brake B4, the sixth shaft TM6 acts as a fixed element. in the instant state, by the operation of the third clutch C3, the torque of the second motor/generator MG2 is input through the fourth shaft TM4, and therefore, the third planetary gear set PG3 outputs a reduced speed through the fifth shaft TM5, realizing the EV1 mode.

[EV 2]

For the EV 2, the engine ENG is stopped, and the third clutch C3 and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the third brake B3, the seventh shaft TM7 acts as a fixed element. in the instant state, the torque of the second motor/generator MG2 is output through the third and fourth shafts TM3 and TM4, and therefore, the third planetary gear set PG3 outputs a reduced speed through the fifth shaft TM5, realizing the EV2 mode.

[EV 3]

For the EV 3, the engine ENG is stopped, and the second brake B2 and the second, third and fourth clutches C2, C3 and C4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operations of the second, third and fourth clutches C2, C3 and C4, the second and third planetary gear sets PG2 and PG3 integrally rotate. in the instant state, the torque of the, third shaft TM3 transferred the seventh, fourth and sixth shafts TM7, TM4, and TM6 is output through the fifth shaft TM5 as inputted, realizing the EV3 mode.

[EV 4]

For the EV 4, the engine ENG is stopped, and the fourth clutch C4 and the second and third brakes B2 and B3 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the fourth clutch C4, the torque of the third shaft TM3 is input to the sixth shaft TM6 and by the operation of the third brake B3, the seventh shaft TM7 acts as a fixed element. Therefore, the third planetary gear set PG3 outputs an increased speed through the fifth shaft TM5, realizing the EV4 mode.

On the other hand, in the above description of the EV driving mode, the second motor/generator MG2 is driven, but it may be realized by driving the first motor/generator MG1 while the second brake B2 is not operated.

[Torque Splitting Mode 1 (I/S 1)]

In the torque splitting mode I/S 1, the third clutch C3 and the fourth brake B4 are operated.

In the second shifting section FTM, by the operation of the fourth brake B4, the sixth shaft TM6 acts as a fixed element. and by the operation of the third clutch C3, the torque of the third shaft TM3 is input through the fourth shaft TM4, is reduced in rotation speed and output through the fifth shaft TM5, realizing the torque splitting mode I/S 1.

In the instant case, the torque inputted to the fourth shaft TM4 is a combined torque of the torque of the engine and the torque of the first motor/generator MG1 in the first shifting section PS.

[Torque Splitting Mode I/S 2]

In the torque splitting mode I/S 2, the third clutch C3 and the third brake B3 are operated.

In the second shifting section FTM, by the operation of the third brake B3, the seventh shaft TM7 acts as a fixed element. in the instant state, by the operation of the third clutch C3, the torque of the third shaft TM3 is input through the fourth shaft TM4, is reduced in rotation speed and outputs through the fifth shaft TM5, realizing the torque splitting mode I/S 2.

In the instant case, the torque inputted to the fourth shaft TM4 is a combined torque of the torque of the engine and the torque of the first motor/generator MG1 in the first shifting section PS.

[Torque Splitting Mode I/S 3]

In the torque splitting mode I/S 3, the second and the second, third and fourth clutches C2, C3, and C4 are operated.

In the second shifting section FTM, by the operations of the second, third, and fourth clutches C2, C3, and C4, the second and third planetary gear sets PG2 and PG3 integrally rotate. Thus, the torque of the third shaft TM3 is output through the fifth shaft TM5 as inputted, realizing the torque splitting mode I/S 3.

In the instant case, the torque inputted to the third shaft TM3 is a combined torque of the torque of the engine and the torque of the first motor/generator MG1 in the first shifting section PS.

[Torque Splitting Mode I/S 4]

In the torque splitting mode I/S 4, the fourth clutch C4 and the third brake B3 are operated.

In the second shifting section FTM, by the operation of the fourth clutch C4, the torque of the third shaft TM3 is input to the sixth shaft TM6. in the instant state, by the operation of the third brake B3, the seventh shaft TM7 acts as a fixed element, the torque of the fifth shaft TM5 is output in an increased rotation speed, realizing the torque splitting mode I/S 4.

In the instant case, the torque inputted to the sixth shaft TM6 is a combined torque of the torque of the engine and the torque of the first motor/generator MG1 in the first shifting section PS.

In the parallel mode P, the vehicle may be driven in a hybrid driving mode HEV by the torque of the engine ENG and the torque of the first and second motor/generators MG1 and MG2, and may also be driven solely by the torque of the engine ENG.

[Parallel Mode First Speed P1]

In the parallel mode first speed P1, the first and third clutches C1 and C3 and the fourth brake B4 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the fourth brake B4, the sixth shaft TM6 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode first speed P1.

[Parallel Mode Second Speed P2]

In the parallel mode second speed P2, the third clutch C3 and the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed through the third shaft TM3.

In the second shifting section FTM, by the operation of the fourth brake B4, the sixth shaft TM6 acts as a fixed element. in the instant state, by the operation of the third clutch C3, the torque of the third shaft TM3 is transferred to the fourth shaft TM4 and is output through the fifth shaft TM5 in reduced rotation speed, realizing the parallel mode second speed P2.

[Parallel Mode Third Speed P3]

In the parallel mode the third speed P3, the first and third clutches C1 and C3 and the third brake B3 are operated.

In the first shifting section PS, by the operation of the first clutch C1, the first planetary gear set PG1 integrally rotates. in the instant state, the torque of the input shaft IS is output as inputted through the third shaft TM3.

In the second shifting section FTM, by the operation of the third brake B3, the seventh shaft TM7 acts as a fixed element. in the instant state, by the operation of the third clutch C3, the torque of the third shaft TM3 is transferred to the fourth shaft TM4, and is output through the fifth shaft TM5 in reduced rotation speed, realizing the parallel mode third speed P3.

[Parallel Mode Fourth Speed P4]

In the parallel mode fourth speed P4, the third clutch C3 and the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operation of the third brake B3, the seventh shaft TM7 acts as a fixed element. in the instant state, the torque of the third shaft TM3 is input through the fourth shaft TM4 by the operation of the third clutch C3, and therefore, the third planetary gear set PG3 outputs a reduced rotation speed through the fifth shaft TM5, realizing the parallel mode fourth speed P4.

[Parallel Mode Fifth Speed P5]

In the parallel mode fifth speed P5, the first, second, third, and fourth clutches C1, C2, C3 and C4 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the second, third and fourth clutches C2, C3 and C4, the torque of the third shaft TM3 is transferred to the seventh, fourth and sixth shafts TM7, TM4, and TM6 so that the second and third planetary gear sets PG2 and PG3 integrally rotate. and the input torque transferred the seventh, fourth and sixth shafts TM7, TM4, and TM6 is output through the fifth shaft TM5 as inputted, realizing the parallel mode the fifth speed P5.

[Parallel Mode Sixth Speed P6]

In the parallel mode sixth speed P6, the second, third and fourth clutches C2, C3 and C4 and the first brake B1 are operated.

In the first shifting section PS, by the operation of the first brake B1, the first shaft TM1 is acts as a fixed element. in the instant state, the torque of the second shaft TM2 transferred from the input shaft IS is output through the third shaft TM3 in an increased rotation speed.

In the second shifting section FTM, by the operations of the second, third and fourth clutches C2, C3 and C4, the torque of the third shaft TM3 is transferred to the seventh, fourth and sixth shafts TM7, TM4, and TM6 so that the second and third planetary gear sets PG2 and PG3 integrally rotate. and the input torque transferred the seventh, fourth and sixth shafts TM7, TM4, and TM6 is output through the fifth shaft TM5 as inputted, realizing the parallel mode the sixth speed P6.

[Parallel Mode Seventh Speed P7]

In the parallel mode seventh speed P7, the first and fourth clutches C1 and C4 and the third brake B3 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the fourth clutch C4, the torque of the third shaft TM3 is input to the sixth shaft TM6. in the instant state, by the operation of the third brake B3, the seventh shaft TM7 acts as a fixed element, thus the torque of the fifth shaft TM5 is output in an increased rotation speed, realizing the parallel mode the seventh speed P7.

[Parallel Mode Eighth Speed P8]

In the parallel mode the sixth speed P6, the fourth clutch C4 and the first and third brakes B1 and B3 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the fourth clutch C4, the torque of the third shaft TM3 is transferred to the sixth shaft TM6, and the seventh shaft TM7 acts as a fixed element by the operation of the third brake B3. and therefore, the third planetary gear set PG3 outputs an increased rotation speed through the fifth shaft TM5, realizing the parallel mode eighth speed P8.

On the other hand, the reverse speed REV in the various exemplary embodiments may include four patterns by electric vehicle mode EV1, torque splitting mode (I/S 1), and parallel modes P1 and P2.

[Reverse REV EV 1]

In the reverse REV EV 1, the engine ENG is stopped, and the second clutch C2 and the second and fourth brakes B2 and B4 are operated while the second motor/generator MG2 is driven.

In the first shifting section PS, by the operation of the second brake B2, the second shaft TM2 acts as a fixed element. in the instant state, the second motor/generator MG2 is driven, and the torque of the second motor/generator MG2 is output through the third shaft TM3.

In the second shifting section FTM, by the operation of the second clutch C2, the torque of the third shaft TM3 is input to the seventh shaft TM7. in the instant state, by the operation of the fourth brake B4, the sixth shaft TM6 acts as a fixed element and thus reversed rotation speed is output through the fifth shaft TM5, realizing the reverse REV EV1.

On the other hand, in the above description of the reverse REV EV1, the second motor/generator MG2 is driven, but it may be realized by driving the first motor/generator MG1 while the second brake B2 is not operated.

[Reverse REV Torque Splitting Mode I/S 1]

In the REV torque splitting mode I/S 1, the second clutch C2 and the fourth brake B4 are operated.

In the second shifting section FTM, by the operation of the fourth brake B4, the sixth shaft TM6 acts as a fixed element. in the instant state, by the operation of the second clutch C2, the torque of seventh shaft TM7 is output through the fifth shaft TM5 in reversed direction thereof, realizing the reverse torque splitting mode I/S 1.

In the instant case, the torque inputted to the fourth shaft TM4 is a combined torque of the torque of the engine and the torque of the first motor/generator MG1 in the first shifting section PS.

[Reverse REV Parallel Mode the First Speed P1]

In the reverse REV parallel mode first speed P1, the first clutch and second clutch C1 and C2 and the fourth brake B4 are operated.

In the first shifting section PS, by the operation of the first clutch C1, the first planetary gear set PG1 integrally rotates. in the instant state, the torque of the input shaft IS outputs as it is through the third shaft TM3.

In the second shifting section FTM, by the operations of the second clutch C2, the torque of the third shaft TM3 is transferred to the seventh shaft TM7. in the instant state, by the operation of the fourth brake B4, the sixth shaft TM6 acts as a fixed element. Thus, the torque of the fifth shaft TM5 is output in reversed rotation speed, realizing the reverse REV parallel mode first speed P1.

[Reverse REV Parallel Mode Second Speed P2]

In the reverse REV parallel mode second speed P2, the second clutch C2 and the first and fourth brakes B1 and B4 are operated.

In the first shifting section PS, by the operation of the first brake B1, the first shaft TM1 acts as a fixed element. in the instant state, the torque of the input shaft IS is input to the second shaft TM2, and the first shifting section PS outputs an increased rotation speed though the third shaft TM3.

In the second shifting section FTM, by the operations of the second clutch C2, the torque of the third shaft TM3 is transferred to the seventh shaft TM7. in the instant state, by the operation of the fourth brake B4, the sixth shaft TM6 acts as a fixed element. Thus, the torque of the fifth shaft TM5 is output in reversed direction thereof, realizing the reverse REV parallel mode second speed P2.

Figure 12:
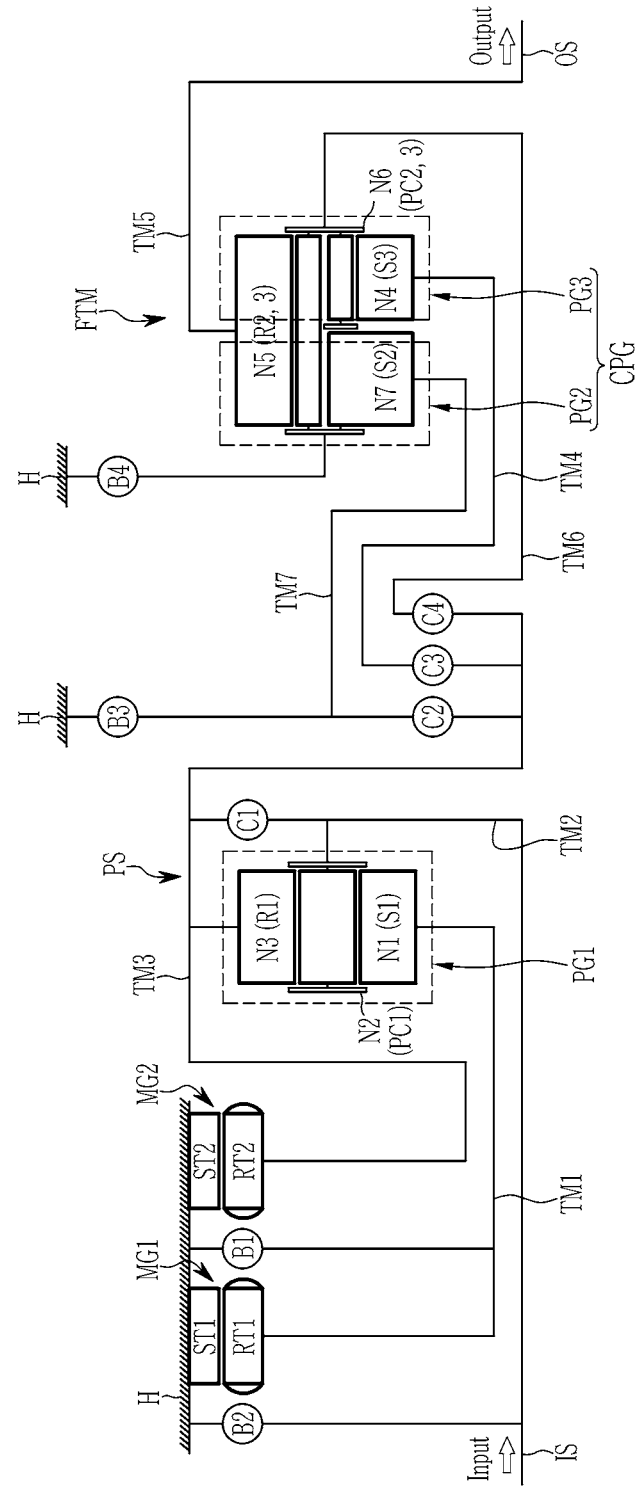
FIG. 12 is a shifting operation chart of a power transmission apparatus of a hybrid electric vehicle according to various exemplary embodiments of the present invention.

FIG. 12 is a shifting operation chart of a power transmission apparatus of a hybrid electric vehicle according to various exemplary embodiments of the present invention.

In comparison with a power transmission apparatus of the various exemplary embodiments shown in FIG. 10 that employs the second and third planetary gear sets PG2 and PG3 forming the second shifting section FTM as the single pinion planetary gear sets, various exemplary embodiments employs a compound planetary gear set CPG having a second planetary gear set PG2 as a single pinion planetary gear set and a third planetary gear set PG3 as a double pinion planetary gear set.

That is, the second and third planetary gear sets PG2 and PG3 shares a ring gear and a planet carrier, and thereby the compound planetary gear set CPG is formed as a Ravingneaux type planetary gear set.

The second planetary gear set PG2 includes a second sun gear S2, a common planet carrier PC2, 3, and a common ring gear R2, 3, and the third planetary gear set PG3 includes a third sun gear S3, the common planet carrier PC2, 3, and the common ring gear R2, 3. The compound planetary gear set CPG forms fourth, fifth, sixth and seventh rotation element N4, N5, N6 and N7 as the third sun gear S3, the common ring gear R2, 3, the common planet carrier PC2, 3 and the second sun gear S2 respectively.

The fourth, fifth, sixth and seventh rotation elements N4, N5, N6 and N7 are connected to the fourth, fifth, sixth and seventh shafts TM4, TM5, TM6 and TM7 independently as in the various exemplary embodiments.

The various exemplary embodiments of FIG. 12 merely differ from the various exemplary embodiments of FIG. 10 of fourth, fifth, sixth and seventh rotation elements N4, N5, N6 and N7, which is therefore not described in further detail.

A power transmission apparatus of a hybrid electric vehicle according to various exemplary embodiments enables usage of first and second motor/generators while driving in a parallel mode of multiple shifting stages, providing high performance and dynamic drivability.

Furthermore, a power transmission apparatus of a hybrid electric vehicle according to various exemplary embodiments enables driving in an EV mode and a torque splitting mode, improving fuel economy.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power transmission apparatus of a hybrid electric vehicle, the power transmission apparatus comprising:
   an input shaft receiving an engine torque output from an engine;
   an output shaft mounted at a same axis with the input shaft and outputting a shifted torque;
   first and second motor/generators;
   a first shifting section including a first planetary gear set, outputting a rotation speed from the input shaft as inputted or increased, or forming an adjusted torque from the engine torque and torques of the first and second motor/generators, and outputting the adjusted torque; and
   a second shifting section engaged to the first shifting section and including a compound planetary gear set formed as a combination of second and third planetary gear sets and outputting a shifted torque from a torque received from the first shifting section to the output shaft, wherein the first planetary gear set includes a first rotation element, a second rotation element, and a third rotation element, wherein the first shifting section further includes:
   a first shaft fixedly connected to the first rotation element, fixedly connected to the first motor/generator and selectively connectable to a transmission housing;
   a second shaft fixedly connected to the second rotation element, fixedly connected to the input shaft and selectively connectable to the transmission housing; and
   a third shaft fixedly connected to the third rotation element, fixedly connected to the second motor/generator and selectively connectable to the second shaft, and wherein the first planetary gear set is a single pinion planetary gear set having a first sun gear, a first planet carrier, and a first ring gear that form the first rotation element, the second rotation element, and the third rotation element, respectively.

2. The power transmission apparatus of claim 1,
wherein the compound planetary gear set forms fourth, fifth, sixth and seventh rotation elements as the combination of second and third planetary gear sets, and
wherein the second shifting section further includes:
   a fourth shaft fixedly connected to the fourth rotation element and fixedly connected to the third shaft;
   a fifth shaft fixedly connected to the fifth rotation element and fixedly connected to the output shaft;
   a sixth shaft fixedly connected to the sixth rotation element and selectively connectable to the fifth shaft or selectively connectable to the transmission housing;
   a seventh shaft fixedly connected to the seventh rotation element and selectively connectable to the transmission housing; and
   a plurality of engagement element including a plurality of clutches connecting corresponding shafts among the first to seventh shafts and a plurality of brakes connecting a corresponding shaft among the first to seventh shafts and the transmission housing.

3. The power transmission apparatus of claim 2,
wherein the second planetary gear set is a single pinion planetary gear set having a second sun gear, a second planet carrier and a second ring gear;
wherein the third planetary gear set is a single pinion planetary gear set having a third sun gear, a third planet carrier and a third ring gear; and
wherein the compound planetary gear set forms the fourth rotation element, the fifth rotation element, the sixth rotation element and the seventh rotation element as the third sun gear, the second ring gear and the third planet carrier, the second planet carrier and the third ring gear, and the second sun gear, respectively.

4. The power transmission apparatus of claim 2, wherein the plurality of engagement elements includes:
   a first clutch mounted between the second shaft and the third shaft;
   a second clutch mounted between the fifth shaft and the sixth shaft;
   a first brake mounted between the first shaft and the transmission housing;
   a second brake mounted between the second shaft and the transmission housing;
   a third brake mounted between the seventh shaft and the transmission housing; and
   a fourth brake mounted between the sixth shaft and the transmission housing.

5. The power transmission apparatus of claim 1,
wherein the compound planetary gear set forms fourth, fifth, sixth and seventh rotation elements as a combination of second and third planetary gear sets, and
wherein the second shifting section further includes:
   a fourth shaft fixedly connected to the fourth rotation element and fixedly connected to the third shaft;
   a fifth shaft fixedly connected to the fifth rotation element and fixedly connected to the output shaft;
   a sixth shaft fixedly connected to the sixth rotation element and selectively connectable to the transmission housing;
   a seventh shaft fixedly connected to the seventh rotation element and selectively connectable to the sixth shaft or selectively connectable to the transmission housing, respectively; and
   a plurality of engagement element including a plurality of clutches connecting corresponding shafts among the first to seventh shafts and a plurality of brakes connecting a corresponding shaft among the first to seventh shafts and the transmission housing.

6. The power transmission apparatus of claim 5,
wherein the second planetary gear set is a single pinion planetary gear set having a second sun gear, a common planet carrier, and a common ring gear;
wherein the third planetary gear set is a double pinion planetary gear set having a third sun gear, the common planet carrier, and the common ring gear; and
wherein the compound planetary gear set forms the fourth rotation element, the fifth rotation element, the sixth rotation element and the seventh rotation element as the third sun gear, the common ring gear, the common planet carrier and the second sun gear, respectively.

7. The power transmission apparatus of claim 5, wherein the plurality of engagement elements includes:
   a first clutch mounted between the second shaft and the third shaft;
   a second clutch mounted between the sixth shaft and seventh shaft;
   a first brake mounted between the first shaft and the transmission housing;
   a second brake mounted between the second shaft and the transmission housing;
   a third brake mounted between the seventh shaft and the transmission housing; and
   a fourth brake mounted between the sixth shaft and the transmission housing.

8. The power transmission apparatus of claim 1,
wherein the compound planetary gear set forms fourth, fifth, sixth and seventh rotation elements as a combination of second and third planetary gear sets, and
wherein the second shifting section further includes:
   a fourth shaft fixedly connected to the fourth rotation element and selectively connectable to the third shaft;
   a fifth shaft fixedly connected to the fifth rotation element and fixedly connected to the output shaft;
   a sixth shaft fixedly connected to the sixth rotation element and selectively connectable to the transmission housing;

a seventh shaft fixedly connected to the seventh rotation element and selectively connectable to the third shaft or selectively connectable to the transmission housing, respectively; and a plurality of engagement element including a plurality of clutches connecting corresponding shafts among the first to seventh shafts and a plurality of brakes connecting a corresponding shaft among the first to seventh shafts and the transmission housing.

9. The power transmission apparatus of claim 8,
wherein the second planetary gear set is a single pinion planetary gear set having a second sun gear, a second planet carrier and a second ring gear;
wherein the third planetary gear set is a single pinion planetary gear set having a third sun gear, a third planet carrier and a third ring gear; and
wherein the compound planetary gear set forms the fourth rotation element, the fifth rotation element, the sixth rotation element and the seventh rotation element as the third sun gear, the second ring gear and the third planet carrier, the second planet carrier and the third ring gear, and the second sun gear, respectively.

10. The power transmission apparatus of claim 8, wherein the plurality of engagement elements includes:
a first clutch mounted between the second shaft and the third shaft;
a second clutch mounted between the third shaft and the seventh shaft;
a third clutch mounted between the third shaft and the fourth shaft;
a first brake mounted between the first shaft and the transmission housing;
a second brake mounted between the second shaft and the transmission housing;
a third brake mounted between the seventh shaft and the transmission housing; and
a fourth brake mounted between the sixth shaft and the transmission housing.

11. The power transmission apparatus of claim 8,
wherein the second planetary gear set is a single pinion planetary gear set having a second sun gear, a common planet carrier, and a common ring gear;
wherein the third planetary gear set is a double pinion planetary gear set having a third sun gear, the common planet carrier, and the common ring gear; and
wherein the compound planetary gear set forms the fourth rotation element, the fifth rotation element, the sixth rotation element and the seventh rotation element as the third sun gear, the common ring gear, the common planet carrier and the second sun gear, respectively.

12. The power transmission apparatus of claim 1,
wherein the compound planetary gear set forms fourth, fifth, sixth and seventh rotation elements as a combination of second and third planetary gear sets, and
wherein the second shifting section further includes:
a fourth shaft fixedly connected to the fourth rotation element and selectively connectable to the third shaft;
a fifth shaft fixedly connected to the fifth rotation element and fixedly connected to the output shaft;
a sixth shaft fixedly connected to the sixth rotation element and selectively connectable to the third shaft or selectively connectable to the transmission housing, respectively;
a seventh shaft fixedly connected to the seventh rotation element and selectively connectable to the transmission housing; and a plurality of engagement element including a plurality of clutches connecting corresponding shafts among the first to seventh shafts and a plurality of brakes connecting a corresponding shaft among the first to seventh shafts and the transmission housing.

13. The power transmission apparatus of claim 12,
wherein the second planetary gear set is a single pinion planetary gear set having a second sun gear, a second planet carrier and a second ring gear;
wherein the third planetary gear set is a single pinion planetary gear set having a third sun gear, a third planet carrier and a third ring gear; and
wherein the compound planetary gear set forms the fourth rotation element, the fifth rotation element, the sixth rotation element and the seventh rotation element as the third sun gear, the second ring gear and the third planet carrier, the second planet carrier and the third ring gear, and the second sun gear respectively.

14. The power transmission apparatus of claim 12, wherein the plurality of engagement elements comprises:
a first clutch mounted between the second shaft and the third shaft;
a second clutch mounted between the third shaft and the sixth shaft;
a third clutch mounted between the third shaft and the fourth shaft;
a first brake mounted between the first shaft and the transmission housing;
a second brake mounted between the second shaft and the transmission housing;
a third brake mounted between the seventh shaft and the transmission housing; and
a fourth brake mounted between the sixth shaft and the transmission housing.

15. The power transmission apparatus of claim 12,
wherein the second planetary gear set is a single pinion planetary gear set having a second sun gear, a common planet carrier, and a common ring gear;
wherein the third planetary gear set is a double pinion planetary gear set having a third sun gear, the common planet carrier, and the common ring gear;
wherein the compound planetary gear set forms the fourth rotation element, the fifth rotation element, the sixth rotation element and the seventh rotation element as the third sun gear, the common ring gear, the common planet carrier and the second sun gear, respectively.

16. The power transmission apparatus of claim 1,
wherein the compound planetary gear set forms fourth, fifth, sixth and seventh rotation elements as a combination of second and third planetary gear sets, and
wherein the second shifting section further includes:
a fourth shaft fixedly connected to the fourth rotation element and selectively connectable to the third shaft;
a fifth shaft fixedly connected to the fifth rotation element and fixedly connected to the output shaft;
a sixth shaft fixedly connected to the sixth rotation element and selectively connectable to the transmission housing;
a seventh shaft fixedly connected to the seventh rotation element and selectively connectable to the third shaft or selectively connectable to the transmission housing, respectively; and
a plurality of engagement element including a plurality of clutches connecting corresponding shafts among the first to seventh shafts and a plurality of brakes connecting a corresponding shaft among the first to seventh shafts and the transmission housing.

17. The power transmission apparatus of claim 16,
wherein the second planetary gear set is a single pinion planetary gear set having a second sun gear, a second planet carrier and a second ring gear;
wherein the third planetary gear set is a single pinion planetary gear set having a third sun gear, a third planet carrier and a third ring gear; and
wherein the compound planetary gear set forms the fourth rotation element, the fifth rotation element, the sixth rotation element and the seventh rotation element as the third sun gear, the second ring gear and the third planet carrier, the second planet carrier and the third ring gear, and the second sun gear, respectively.

18. The power transmission apparatus of claim 16, wherein the second planetary gear set is a single pinion planetary gear set having second sun gear, a common planet carrier, and a common ring gear; wherein the third planetary gear set is a double pinion planetary gear set having a third sun gear, the common planet carrier, and the common ring gear; and wherein the compound planetary gear set forms the fourth rotation element, the fifth rotation element, the sixth rotation element and the seventh rotation element as the third sun gear, the common ring gear, the common planet carrier and the second sun gear, respectively.

* * * * *